US010490110B2

(12) United States Patent
Na et al.

(10) Patent No.: US 10,490,110 B2
(45) Date of Patent: Nov. 26, 2019

(54) DISPLAY APPARATUS, METHOD OF DRIVING THE SAME AND METHOD OF MANUFACTURING THE SAME

(71) Applicant: SAMSUNG DISPLAY CO., LTD., Yongin-si, Gyeonggi-Do (KR)

(72) Inventors: Jong-Hee Na, Asan-si (KR); Hoisik Moon, Hwaseong-si (KR); Kang-Hyun Kim, Seoul (KR); Juneyoung Lee, Seoul (KR); Hyungwoo Yim, Hwaseong-si (KR); Jae-Seob Chung, Asan-si (KR); Min-Yup Chae, Cheonan-si (KR); Jae-Seok Choi, Uijeongbu-si (KR); Hak-Mo Choi, Seoul (KR); Jung-Suk Han, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 434 days.

(21) Appl. No.: 15/461,964

(22) Filed: Mar. 17, 2017

(65) Prior Publication Data

US 2017/0337861 A1 Nov. 23, 2017

(30) Foreign Application Priority Data

May 20, 2016 (KR) ........................ 10-2016-0062408

(51) Int. Cl.

*G06F 3/038* (2013.01)
*G09G 3/00* (2006.01)
*G09G 3/36* (2006.01)

(52) U.S. Cl.

CPC ........... *G09G 3/006* (2013.01); *G09G 3/3674* (2013.01); *G09G 3/3685* (2013.01);
(Continued)

(58) Field of Classification Search

CPC .... G09G 3/006; G09G 3/3674; G09G 3/3685; G09G 3/3696; G09G 2300/0426;
(Continued)

(56) References Cited

U.S. PATENT DOCUMENTS

| | | | | |
|---|---|---|---|---|
| 7,190,824 | B2 * | 3/2007 | Chen | G03F 7/70633 257/797 |
| 7,271,905 | B2 * | 9/2007 | Smith | G03F 7/70558 356/401 |
| 2008/0149926 | A1 * | 6/2008 | Lee | H01L 22/34 257/48 |

FOREIGN PATENT DOCUMENTS

| | | |
|---|---|---|
| KR | 1020100118814 | 11/2010 |
| KR | 10-20130019776 | 2/2013 |
| KR | 1020130037810 | 4/2013 |

* cited by examiner

*Primary Examiner* — Kent W Chang
*Assistant Examiner* — Andrew Lee
(74) *Attorney, Agent, or Firm* — F. Chau & Associates, LLC

(57) ABSTRACT

A display apparatus includes, a first pattern included in a first layer, a second pattern included in a second layer, a first test pattern including a plurality of first lines extending in a first direction and having a first width, and being spaced apart from each other, a second test pattern included in the second layer, including a central line and a plurality of second lines connected to the central line, wherein the plurality of second lines extend in the first direction have a second width, and are spaced apart from each other, and wherein at least one of the second lines is electrically connected to the first lines, and a shift tester configured to apply a test voltage to the central line to determine a degree by which the second pattern is shifted with respect to the first pattern by measuring the voltages at the first lines.

21 Claims, 30 Drawing Sheets

(52) U.S. Cl.
CPC ... *G09G 3/3696* (2013.01); *G09G 2300/0426* (2013.01); *G09G 2310/0289* (2013.01); *G09G 2310/08* (2013.01); *G09G 2320/0242* (2013.01); *G09G 2330/12* (2013.01)

(58) Field of Classification Search
CPC ....... G09G 2310/0289; G09G 2310/08; G09G 2320/0242; G09G 2330/12
See application file for complete search history.

150a

150a

150a

DISPLAY APPARATUS, METHOD OF DRIVING THE SAME AND METHOD OF MANUFACTURING THE SAME

CROSS-REFERENCE TO RELATED APPLICATION

This application claims priority under 35 U.S.C. § 119 to Korean Patent Application No. 10-2016-0062408, filed on May 20, 2016, in the Korean Intellectual Property Office (KIPO), the disclosure of which is incorporated by reference herein in its entirety.

TECHNICAL FIELD

Exemplary embodiments of the present inventive concept relate to a display apparatus, and more particularly to a display apparatus, methods of driving the display apparatus and methods of manufacturing the display apparatus.

DISCUSSION OF THE RELATED ART

Generally, a liquid crystal display ("LCD") apparatus includes a first substrate including a pixel electrode, a second substrate including a common electrode, and a liquid crystal layer disposed between the first and second substrates. An electric field is generated by voltage applied to the pixel electrode and the common electrode. The liquid crystal layer is subjected to the electric field, and an amount of light passing through the liquid crystal layer depends on the magnitude of the electric field. By adjusting the magnitude of the electric field, the amount of light passing through the liquid crystal layer may be adjusted so that a desired image may be displayed.

The LCD apparatus includes a display panel and a panel driver driving the display panel. The display panel includes a plurality of gate lines, a plurality of data lines and a plurality of pixels connected to the gate lines and the data lines. The panel driver includes a gate driver transmitting gate signals to the gate lines, and a data driver transmitting data voltages to the data lines.

SUMMARY

Exemplary embodiments of the present inventive concept relate to a display apparatus having increased display quality.

Exemplary embodiments of the present inventive concept relate to a method of driving the display apparatus.

Exemplary embodiments of the present inventive concept relate to a method of manufacturing a display apparatus having an increased display quality.

According to an exemplary embodiment of the present inventive concept, a display apparatus includes a substrate, a first pattern included in a first layer, wherein the first layer is disposed on the substrate, a second pattern included in a second layer different from the first layer, a first test pattern including a plurality of first lines, wherein each of the plurality of first lines extends in a first direction and has a first width, and wherein each of the plurality of first lines is spaced apart from a neighboring first line by a first distance in a second direction, a second test pattern included in the second layer, wherein the second test pattern includes a central line and a plurality of second lines, wherein the central line extends in the second direction, wherein the plurality of second lines are connected to the central line, wherein each of the plurality of second lines extends in the first direction and has a second width, wherein each of the plurality of second lines is spaced apart from a neighboring second line by a second distance in the second direction, and wherein at least one of the second lines is electrically connected to the first lines, and a shift tester configured to apply a test voltage to the central line to determine a degree by which the second pattern is shifted with respect to the first pattern by measuring the voltages at the first lines.

According to an exemplary embodiment of the present inventive concept, a method of driving a display apparatus includes applying a test voltage to a first test pattern which is electrically connected to a first pattern, wherein the first test pattern is included in a first layer, wherein the first layer is disposed on a substrate, wherein the first test pattern includes a central line and a plurality of first lines connected to the central line, wherein the central line extends in a first direction and each of the first lines extend in a second direction crossing the first direction, wherein each of the first lines has a first width and each of the first lines is spaced part from a neighboring first line by a first distance in the first direction, measuring a voltage from each of a plurality of second lines, each of which is electrically connected to a second pattern, wherein the second lines are included in a second layer different from the first layer, wherein the second lines extend in the second direction, and wherein each of the second lines has a second width and each of the second lines is spaced part from a neighboring second line by a second distance in the first direction, and determining how much the first pattern is shifted with respect to the second pattern based on the measured voltage.

According to an exemplary embodiment of the present inventive concept, a method of manufacturing a display apparatus includes forming a first test pattern including a plurality of first lines and forming a first pattern on a substrate, wherein each of the first lines extends in a first direction and has a first width, and wherein each of the first lines is spaced apart from a neighboring first line by a first distance in a second direction crossing the first direction, and forming a second test pattern including a central line and a plurality of second lines and forming a second pattern on the substrate, wherein the central line extends in the second direction, wherein the second lines are connected to the central line, wherein each of the second lines extends in the first direction and has a second width, and wherein each of the second lines is spaced apart from a neighboring second line by a second distance in the second direction.

According to an exemplary embodiment of the present inventive concept, a display apparatus includes a substrate, a first pattern included in a first layer, wherein the first layer is disposed over the substrate, a second pattern included in a second layer disposed over the substrate, a first plurality of test patterns including a plurality of first lines included in the first pattern, a second plurality of test patterns included in the second pattern, wherein the second plurality of test patterns includes a central line connected to a plurality of second lines, wherein at least one of the first plurality of test patterns overlap and electrically connected to at least one of the second plurality of test patterns, and a shift tester configured to apply a test voltage to the central line to determine which of the first plurality of the first patterns and the second plurality of test patterns are overlapped and electrically connected by measuring the voltages at the first lines.

BRIEF DESCRIPTION OF THE DRAWINGS

The above and other features of the present inventive concept will become more apparent by describing in detailed exemplary embodiments thereof with reference to the accompanying drawings, in which.

DETAILED DESCRIPTION OF THE EMBODIMENTS

Figure 1:
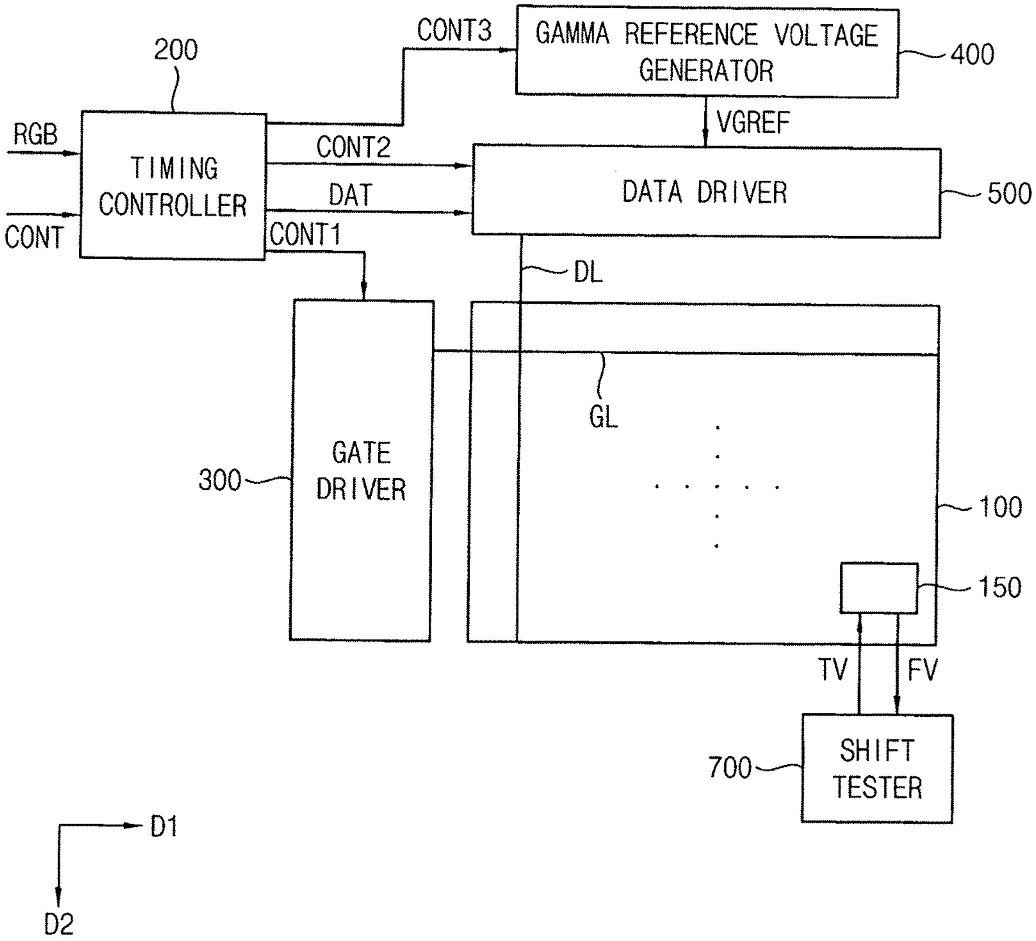
FIG. 1 is a block diagram illustrating a display apparatus according to an exemplary embodiment of the present inventive concept.

Hereinafter, the present inventive concept will be explained in detail with reference to the accompanying drawings. The sizes and proportions of the elements illustrated in the drawings may be exaggerated for clarity. When an element is referred to as being disposed on, formed on, formed above or formed below another element, the element may be directly disposed on the other element, on intervening elements may be interposed therebetween.

Figure 2:
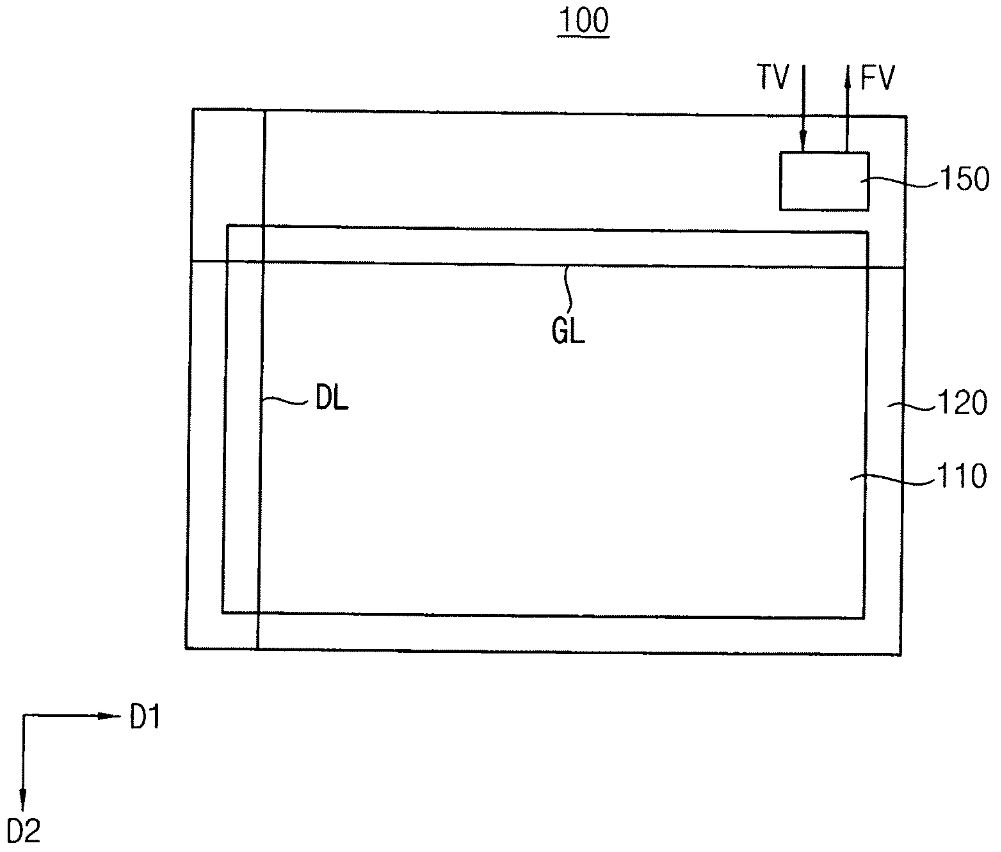
FIG. 2 is a block diagram illustrating a display panel included in a display apparatus, according to an exemplary embodiment of the present inventive concept.

FIG. 1 is a block diagram illustrating a display apparatus according to an exemplary embodiment of the present inventive concept. FIG. 2 is a block diagram illustrating a display panel included in a display apparatus, according to an exemplary embodiment of the present inventive concept.

Referring to FIGS. 1 and 2, the display apparatus includes a display panel 100 and a panel driver. The panel driver includes a timing controller 200, a gate driver 300, a gamma reference voltage generator 400, a data driver 500 and a shift tester 700.

The display panel 100 includes a display region 110 for displaying an image and a peripheral region 120 adjacent to the display region 110.

The display panel 100 includes a plurality of gate lines GL, a plurality of data lines DL and a plurality of pixels electrically connected to the gate lines GL and the data lines DL. The gate lines GL extend in a first direction D1 and the data lines DL extend in a second direction D2 crossing the first direction D1.

In an exemplary embodiment of the present inventive concept, the pixels may include a switching element, a liquid crystal capacitor and a storage capacitor. The liquid crystal capacitor and the storage capacitor may be electrically connected to the switching element. The pixels may be arranged in a matrix configuration.

The display panel 100 includes a test pattern part 150. The test pattern part 150 includes a first pattern and a second pattern disposed therein. The test pattern part 150 may also be disposed in the peripheral region 120.

The composition and the operations of the test pattern part 150 will be described in detail with reference to FIGS. 3A through 3J, 4A, 4B, 5A and 5B. The method of manufacturing the test pattern part 150 will be described in detail with reference to FIGS. 10A through 10C and 12A through 12C.

The timing controller 200 receives input image data RGB. The input image data RGB may include red image data R, green image data G and blue image data B. In addition, the timing controller 200 receives an input control signal CONT from an external device. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3 and a data signal DAT based on the input image data RGB and the input control signal CONT.

The timing controller 200 generates the first control signal CONT1 for controlling operations of the gate driver 300 based on the input control signal CONT, and outputs the first control signal CONT1 to the gate driver 300. The first control signal CONT1 may include a vertical start signal and a gate clock signal.

The timing controller 200 generates the second control signal CONT2 for controlling operations of the data driver 500 based on the input control signal CONT, and outputs the second control signal CONT2 to the data driver 500. The second control signal CONT2 may include a horizontal start signal and a load signal.

The timing controller 200 generates the data signal DAT based on the input image data RGB. The timing controller 200 outputs the data signal DAT to the data driver 500.

The timing controller 200 generates the third control signal CONT3 for controlling operations of the gamma reference voltage generator 400 based on the input control signal CONT, and outputs the third control signal CONT3 to the gamma reference voltage generator 400.

The timing controller 200 will be described in detail below with reference to FIGS. 6 and 7.

The gate driver 300 generates gate signals for driving the gate lines GL based on the first control signal CONT1 received from the timing controller 200. The gate driver 300 sequentially outputs the gate signals to the gate lines GL.

In an exemplary embodiment of the present inventive concept, the gate driver 300 may be directly mounted on the display panel 100. Alternatively, the gate driver 300 may be connected to the display panel 100 as a tape carrier package (TCP) type. In addition, the gate driver 300 may be integrated on the peripheral region 120 of the display panel 100.

The gamma reference voltage generator 400 generates a gamma reference voltage VGREF based on the third control signal CONT3 received from the timing controller 200. The gamma reference voltage generator 400 outputs the gamma reference voltage VGREF to the data driver 500. The level of the gamma reference voltage VGREF corresponds to grayscales of a plurality of pixel data included in the data signal DAT.

In an exemplary embodiment of the present inventive concept, the gamma reference voltage generator 400 may be disposed in the timing controller 200. Alternatively, the gamma reference voltage generator 400 may be disposed in the data driver 500.

The data driver 500 receives the second control signal CONT2 and the data signal DAT from the timing controller 200, and the data driver 500 receives the gamma reference voltage VGREF from the gamma reference voltage generator 400. The data driver 500 converts the data signal DAT to analog data voltages based on the gamma reference voltage VGREF. The data driver 500 outputs the data voltages to the data lines DL.

In an exemplary embodiment of the present inventive concept, the data driver 500 may be directly mounted on the display panel 100. Alternatively, the data driver 500 may be connected to the display panel 100 as a tape carrier package (TCP) type. In addition, the data driver 500 may be integrated on the peripheral region 120 of the display panel 100.

The shift tester 700 applies a test voltage TV to the test pattern part 150. The shift tester 700 then measures voltages FV received from the test pattern part 150. The shift tester 700 can determine how much the second pattern is shifted with respect to the first pattern based on the voltages FV.

The operations of the shift tester 700 will be explained in detail below with reference to FIGS. 3A through 3J.

Figure 3A:
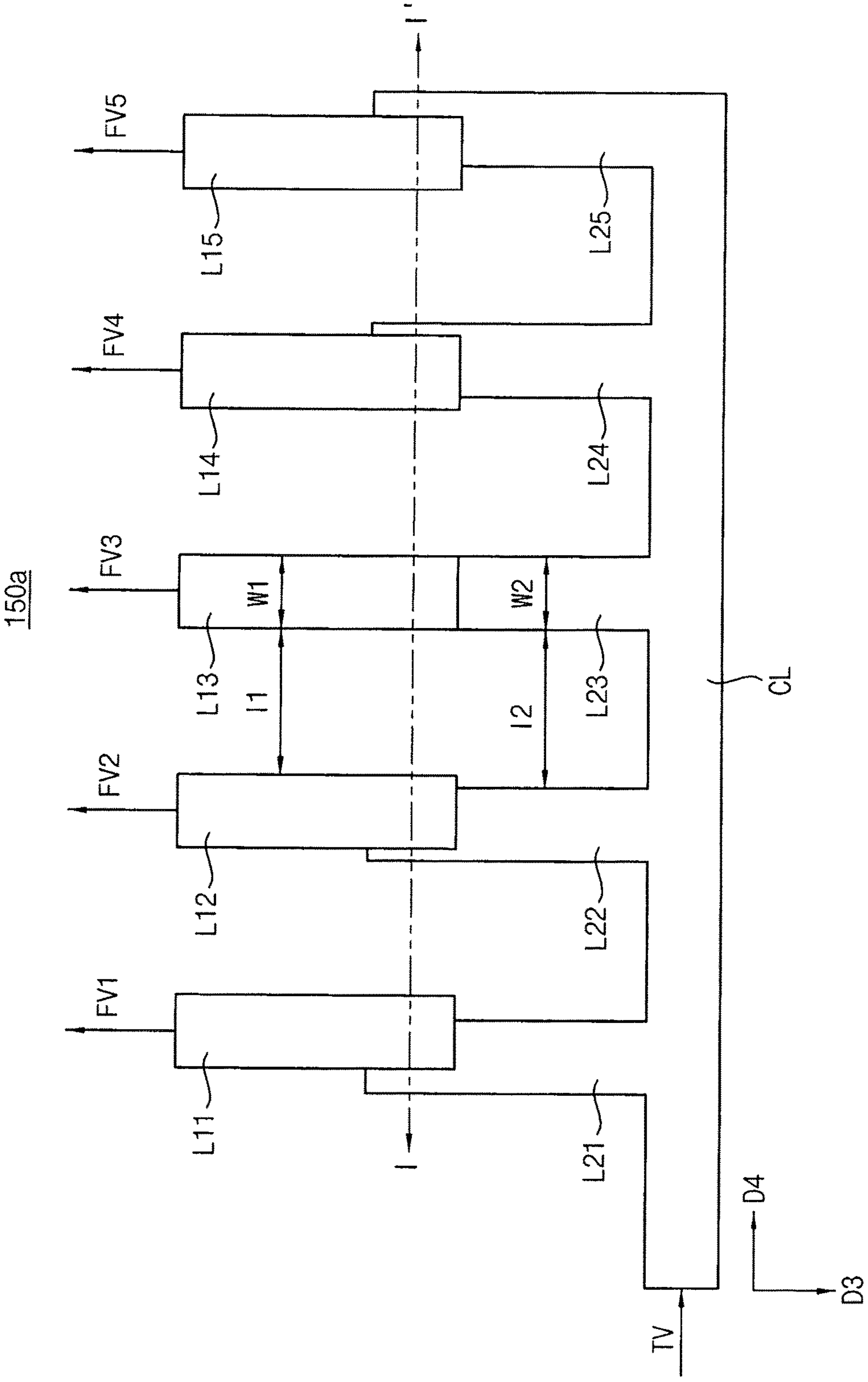
FIG. 3A is a diagram illustrating first and second test patterns included in a display apparatus according to an exemplary embodiment of the present inventive concept.
Figure 3B:
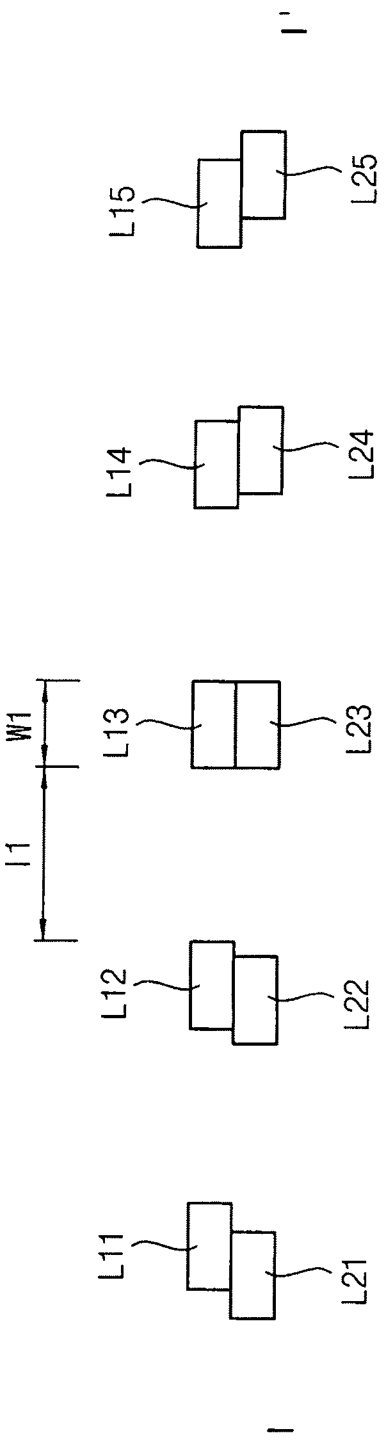
FIG. 3B is a cross-section taken along line I-I' of FIG. 3A.

FIG. 3A is a diagram illustrating first and second test patterns included in a display apparatus according to an exemplary embodiment of the present inventive concept. FIG. 3B is a cross-section taken along line I-I' of FIG. 3A.

Referring to FIGS. 1, 2, 3A and 3B, a test pattern part 150*a* includes first and second test patterns. The first test pattern includes a plurality of first lines L11, L12, L13, L14 and L15. The second test pattern includes a central line CL and a plurality of second lines L21, L22, L23, L24 and L25. However, it is understood that each of the first and second test patterns may include more or less than five first and second lines.

As shown, the first lines L11-L15 extend in a third direction D3. The third direction D3 may be substantially the same as the first direction D1. Alternatively, the third direction D3 may be substantially the same as the second direction D2. Each of the first lines L11-L15 has a first width W1. The first lines L11-L15 are spaced apart from each other by a first distance I1.

The central line CL extends in a fourth direction D4 crossing the third direction D3. The fourth direction D4 may be substantially the same as the second direction D2. Alternatively, the fourth direction D4 may be substantially the same as the first direction D1.

The second lines L21-L25 are connected to the central line CL. The second lines L21-L25 extend in the third direction D3. Each of the second lines L21-L25 has a second width W2. The second width W2 may be different from the first width W1. The second lines L21-L25 are spaced apart from each other by a second distance I2. The second distance I2 may be different from the first distance I1. A sum of the first width W1 and the first distance I1 may be different from a sum of the second width W2 and the second distance I2.

In FIGS. 3A through 3J, the second width W2 is substantially the same as the first width W1, and the second distance I2 is different from the first distance I1. In other words, a sum of the first width W1 and the first distance I1 may be different from a sum of the second width W2 and the second distance I2.

The relationship between the first width W1 and the second width W2 and the relationship between the first distance I1 and the second distance I2 will be described in detail below with reference to FIGS. 4A and 5A.

The number of the second lines L21-L25 may be the same as the number of the first lines L11-L15. However, exemplary embodiments of the present inventive concept are not limited thereto.

At least one of the second lines L21-L25 may be electrically connected to the first lines L11-L15. However, as illustrated in FIG. 3A, each of the second lines L21-L25 may be electrically connected to a respective one of the first lines L11-L15.

The first test pattern may be formed in a first layer. A first pattern may be formed in the first layer. The first pattern may include one of the data lines DL and a pixel electrode.

The second test pattern may be formed in a second layer. The second layer may be a layer that is different from the first layer. The second layer may be disposed below the first layer. For example, the second layer may be disposed directly below the first layer. Thus, the second layer may directly contact the first layer. Accordingly, the second lines L21-L25 may directly contact the first lines L11-L15. A second pattern is in the second layer. The second pattern may also include one of the data lines DL and the pixel electrode.

The shift tester 700 applies the test voltage TV to the central line CL. The shift tester 700 measures voltages FV1, FV2, FV3, FV4, FV5, respectively, from the first lines L11, L12, L13, L14 and L15.

As shown in FIGS. 3A and 3B, all of the second lines L21-L25 are electrically connected to the first lines L11-L15. Accordingly, each of the voltages FV1, FV2, FV3, FV4, and FV5 may be substantially equal to a feedback voltage. The feedback voltage may correspond to the test voltage TV. For example, the feedback voltage may be substantially equal to the test voltage TV. Thus, the shift tester 700 may determine that the second pattern is not substantially shifted with respect to the first pattern in FIG. 3A. In other words, the shift tester 700 may determine that each of the second lines L21-L25 is directly connected to a respective one of the first lines L11-L15.

Figure 3C:
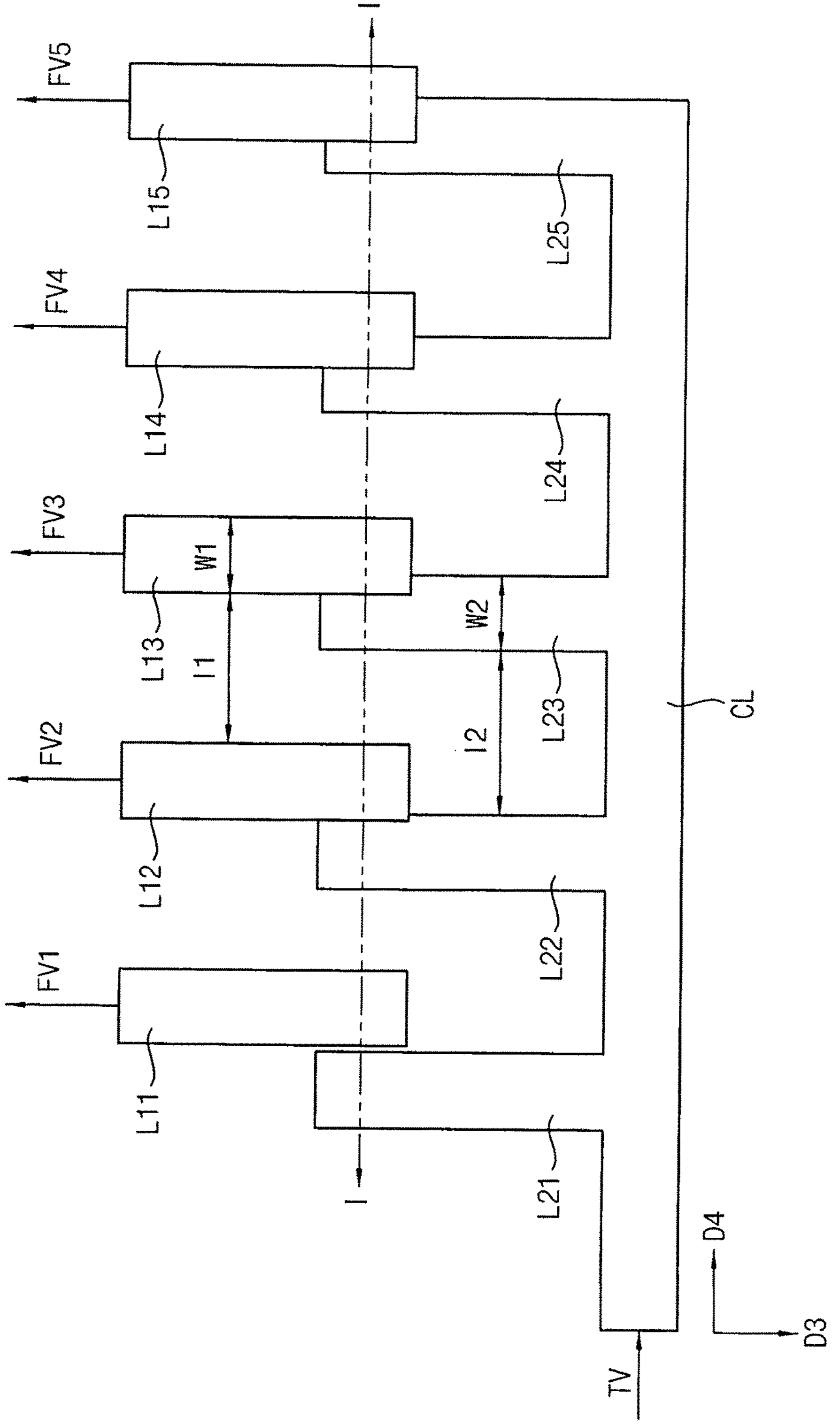
FIGS. 3C, 3E, 3G and 3I are diagrams illustrating first and second test patterns of FIG. 3A being shifted, according to exemplary embodiments of the present inventive concept.
Figure 3D:
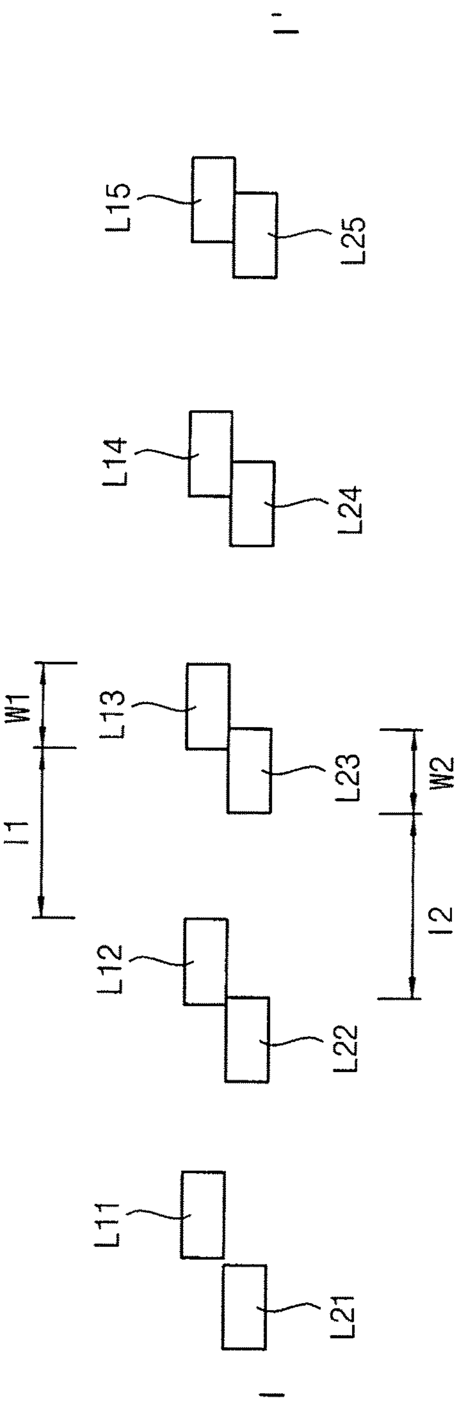
FIGS. 3D, 3F, 3H and 3J are cross-sections taken along line I-I' of FIGS. 3C, 3E, 3G and 3I respectively.

FIG. 3C is a diagram illustrating a second test pattern being shifted to a first side with respect to a first pattern by a first degree, according to an exemplary embodiment of the present inventive concept. The first side may be, for example, a right side. The first degree may mean that one first line is disconnected from one second line. FIG. 3D is a cross-section taken along a line I-I' of FIG. 3C.

Referring to FIGS. 1, 2, 3C and 3D, the first lines L11, L12, L13, L14 and L15 may be arranged along the fourth direction D4. The second lines L21, L22, L23, L24 and L25 may also be arranged along the fourth direction D4.

The shift tester 700 applies the test voltage TV to the central line CL. The shift tester 700 then measures the voltages FV1, FV2, FV3, FV4, FV5 from the first lines L11, L12, L13, L14 and L15.

As shown in FIG. 3C, the second lines L22, L23, L24 and L25 are electrically connected to the first lines L12, L13, L14 and L15. However, the second line L21 is not electrically connected to the first line L11. Accordingly, the voltages FV2, FV3, FV4 and FV5 from the first lines L12, L13, L14 and L15 are substantially equal to the feedback voltage. The voltage FV1 from the first line L11 is not equal to the feedback voltage. Thus, the shift tester 700 may determine that the second pattern is shifted and disconnected from the first pattern by a first degree (e.g., one first line is disconnected from one second line).

Figure 3E:
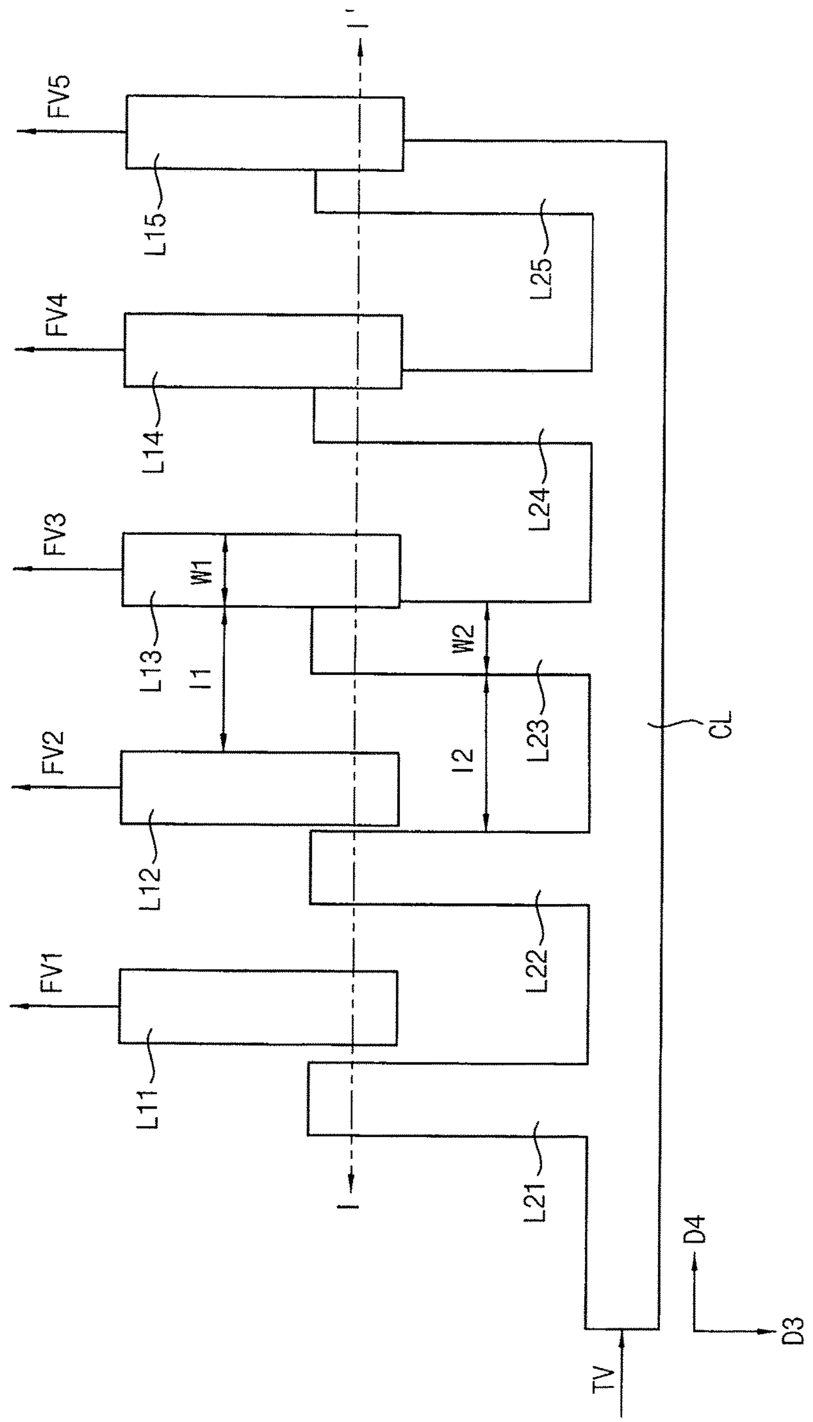
Figure 3F:
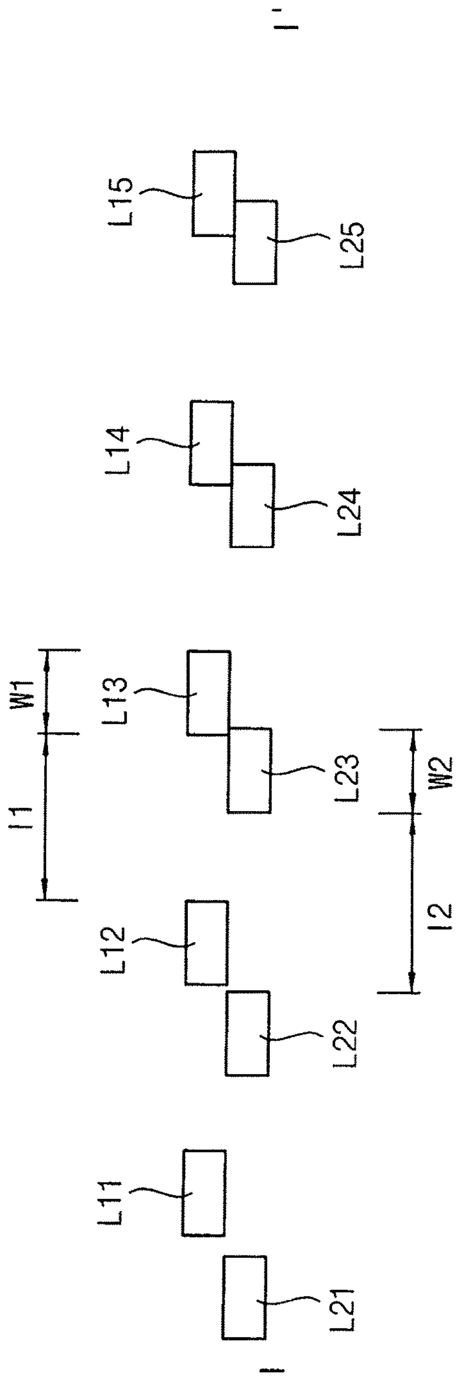

FIG. 3E is a diagram illustrating a second test pattern being shifted to a first side with respect to a first pattern by a second degree, according to an exemplary embodiment of the present inventive concept. The second degree may mean that two first lines are disconnected from two second lines. The first side may be, for example, a right side. FIG. 3F is a cross-section taken along line I-I' of FIG. 3E.

Referring to FIGS. 1, 2, 3E and 3F, the first lines L11, L12, L13, L14 and L15 may be sequentially arranged along the fourth direction D4. The second lines L21, L22, L23, L24 and L25 may be sequentially arranged along the fourth direction D4. The first and second lines L11, L12, L13, L14 and L15, and L21, L22, L23, L24 and L25 may be overlapped along the fourth direction D4.

The shift tester 700 applies the test voltage TV to the central line CL. The shift tester 700 measures the voltages FV1, FV2, FV3, FV4, FV5 from the first lines L11, L12, L13, L14 and L15.

As shown in FIG. 3E, the second lines L23, L24 and L25 are electrically connected to the first lines L13, L14 and L15. The second lines L21, L22 are not electrically connected to the first lines L11 and L12. Accordingly the voltages FV3, FV4, FV5 from some of the first lines L13, L14 and L15 are substantially equal to the feedback voltage. The voltages FV1 and FV2 from the first lines L11, L12 are not equal to the feedback voltage. Thus, the shift tester 700 may determine that the second pattern is shifted with respect to the first pattern by a second degree (e.g., two first lines are disconnected from two second lines). The first degree is greater than the first degree.

Figure 3G:
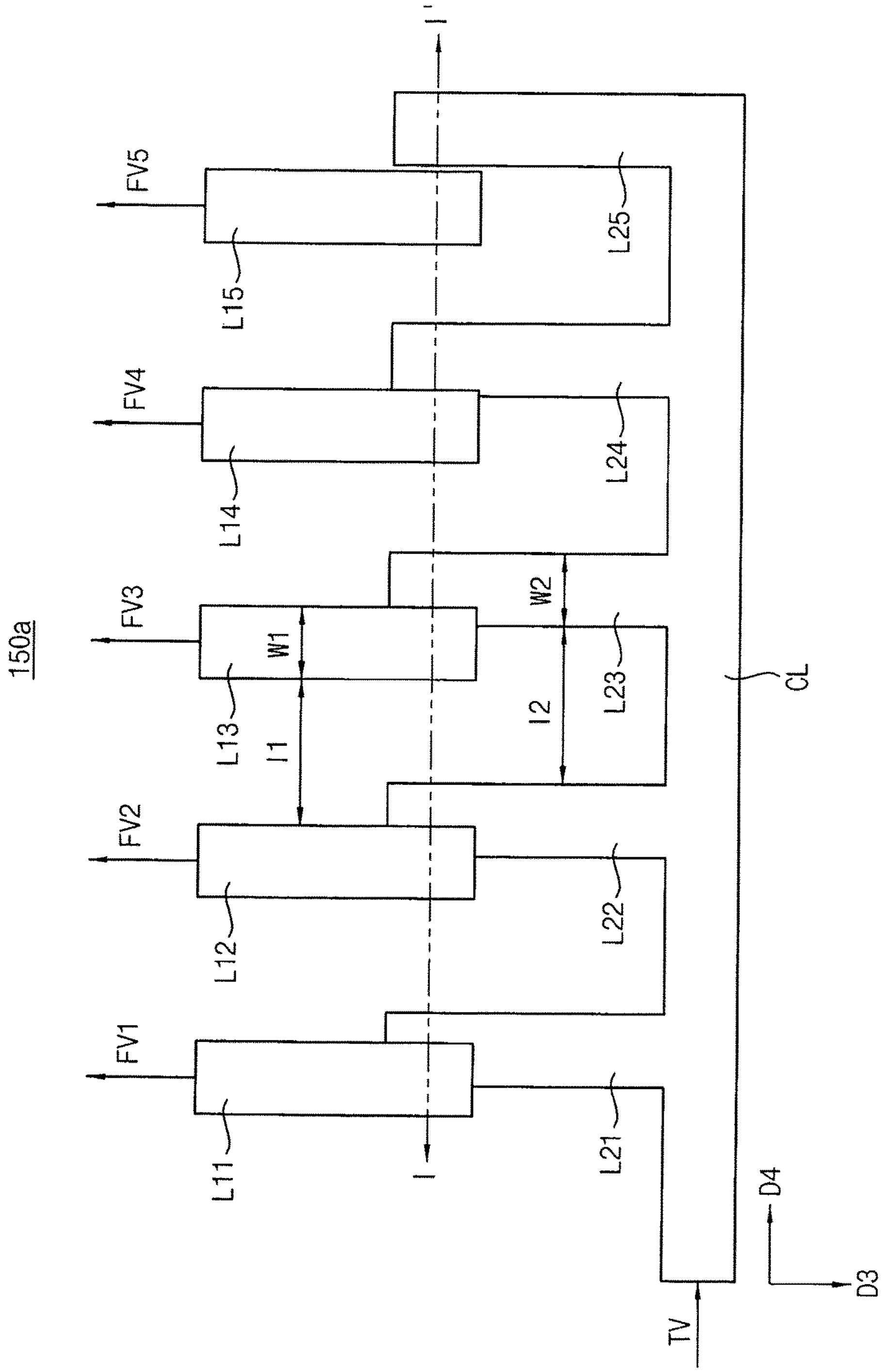
Figure 3H:
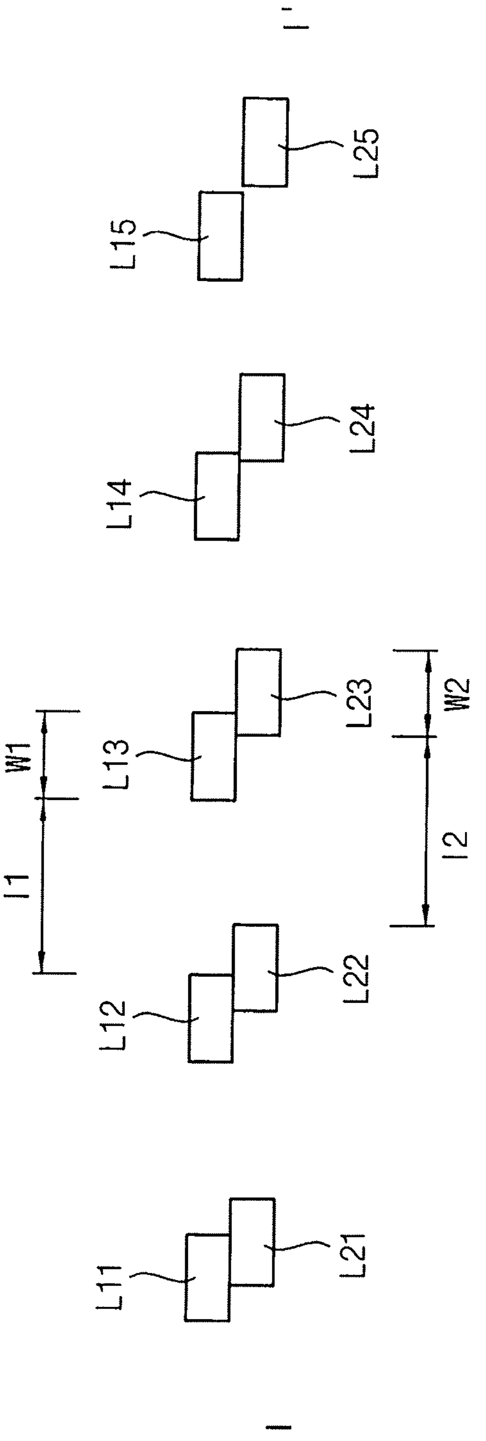

FIG. 3G is a diagram illustrating a second test pattern being shifted to a second side with respect to a first pattern by a first degree, according to an exemplary embodiment of the present inventive concept. The second side may be opposite to the first side and may be, for example, a left side. The first degree may mean that one first line is disconnected from one second line. FIG. 3H is a cross-section taken along line I-I' of FIG. 3G.

Referring to FIGS. 1, 2, 3G and 3H, the first lines L11, L12, L13, L14 and L15 may be sequentially arranged along the fourth direction D4. The second lines L21, L22, L23, L24 and L25 may be sequentially arranged along the fourth direction D4. The first and second lines L11, L12, L13, L14 and L15, and L21, L22, L23, L24 and L25 may be overlapped along the fourth direction D4.

The shift tester 700 applies the test voltage TV to the central line CL. The shift tester 700 measures the voltages FV1, FV2, FV3, FV4 and FV5 from the first lines L11, L12, L13, L14 and L15.

As shown in FIG. 3G, the second lines L21, L22, L23 and L24 are electrically connected to the first lines L11, L12, L13 and L14. The second lines L25 is not electrically connected to the first line L15. Accordingly, the voltages FV1, FV2, FV3 and FV4 from the first lines L11, L12, L13 and L14 are substantially equal to the feedback voltage. The voltage FV5 from the first line L15 is not equal to the feedback voltage. Thus, the shift tester 700 may determine that the second pattern is shifted to the second side by a first degree (e.g., one first line is disconnected from one second line).

Figure 3I:
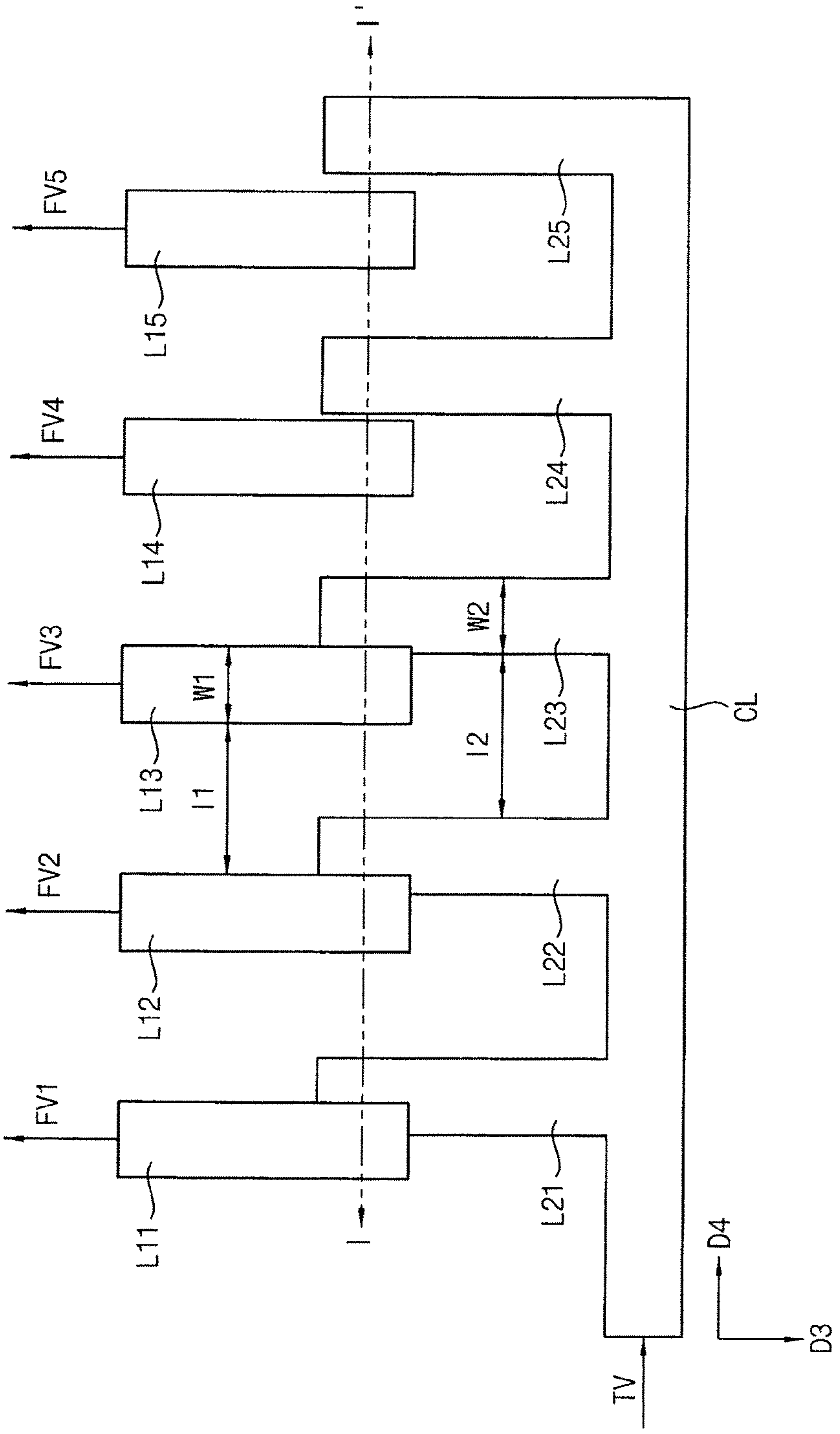
Figure 3J:
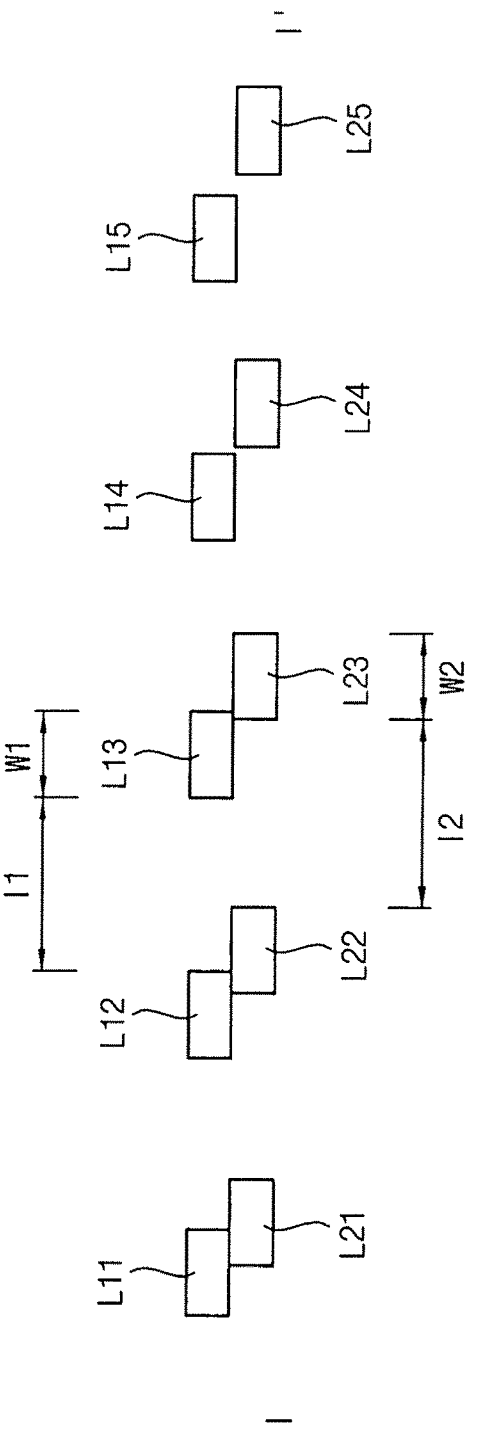

FIG. 3I is a diagram illustrating a second test pattern being shifted to a second side with respect to a first pattern by a second degree, according to an exemplary embodiment of the present inventive concept. The second side may be opposite to the first side and may be, for example, a left side. The second degree may mean that two first lines are disconnected from two second lines. FIG. 3J is a cross-section taken along line I-I' of FIG. 3I.

Referring to FIGS. 1, 2, 3I and 3J, the first lines L11, L12, L13, L14 and L15 may be sequentially arranged along the fourth direction D4. The second lines L21, L22, L23, L24 and L25 may be sequentially arranged along the fourth direction D4. The first and second lines L11, L12, L13, L14 and L15, and L21, L22, L23, L24 and L25 may be overlapped along the fourth direction D4.

The shift tester 700 applies the test voltage TV to the central line CL. The shift tester 700 measures the voltages FV1, FV2, FV3, FV4 and FV5 from the first lines L11, L12, L13, L14 and L15.

As shown in FIG. 3I, the second lines L21, L22 and L23 are electrically connected to some of the first lines L11, L12, L13. The second lines L24 and L25 are not electrically connected to the first lines L14 and L15. Accordingly, the voltages FV1, FV2, and FV3 from the first lines L11, L12 and L13 are substantially equal to the feedback voltage. The voltages FV4 and FV5 from first lines L14 and L15 are not equal to the feedback voltage. Thus, the shift tester 700 may determine that the second pattern is shifted to the second side by a second degree (e.g., two first lines are disconnected from two second lines). The second degree may be greater than the first degree.

Figure 4A:
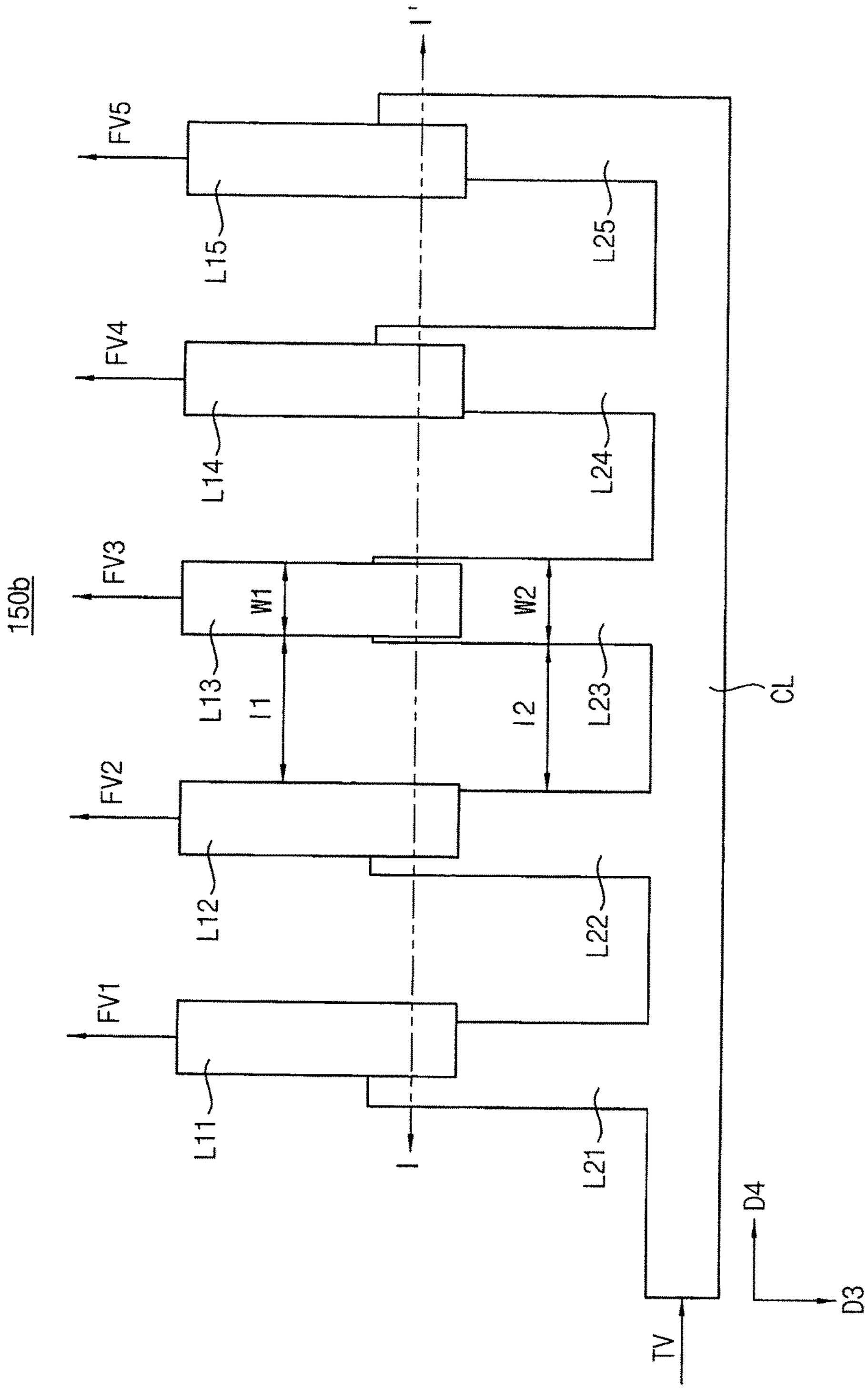
FIG. 4A is a diagram illustrating first and second test patterns included in a display apparatus according to an exemplary embodiment of the present inventive concept.
Figure 4B:
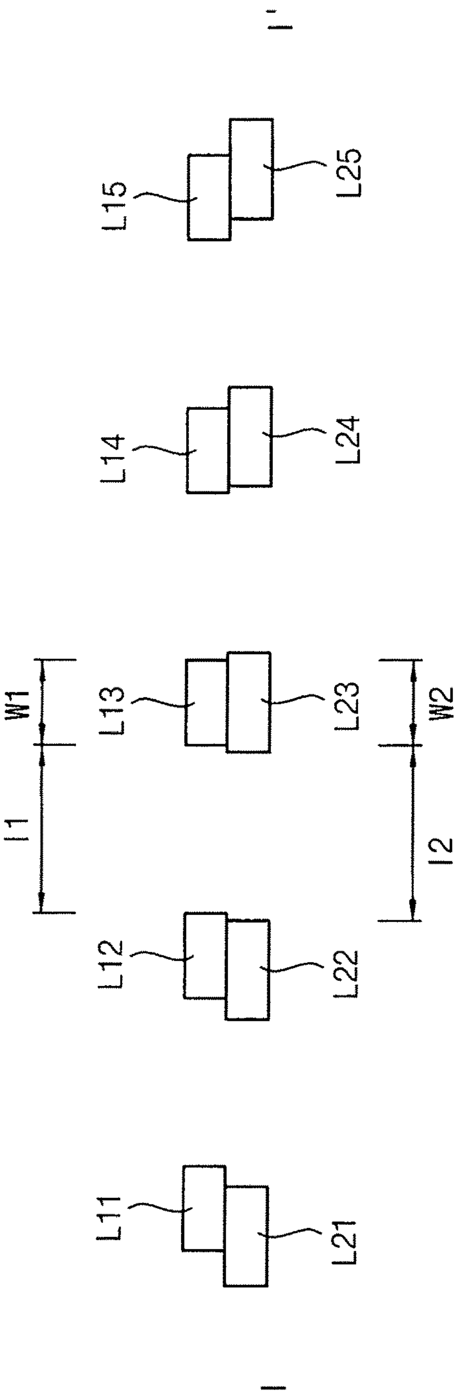
FIG. 4B is a cross-section taken along line I-I' of FIG. 4A.

FIG. 4A is a diagram illustrating first and second test patterns included in a display apparatus according to an exemplary embodiment of the present inventive concept. FIG. 4B is a cross-section taken along line I-I' of FIG. 4A.

Referring to FIGS. 1, 2, 4A and 4B, a test pattern part 150*b* includes first and second test patterns. The first test pattern includes a plurality of first lines L11, L12, L13, L14 and L15. The second test pattern includes a central line CL and a plurality of second lines L21, L22, L23, L24 and L25.

Each of the first lines L11-L15 has a first width W1. The first lines L11-L15 are spaced apart from each other by a first distance I1. Each of the second lines L21-L25 has a second width W2. The second width W2 may be different from the first width W1. The second lines L21-L25 are spaced apart from each other by a second distance I2. The second distance I2 may be different from the first distance I1.

As shown in FIGS. 4A and 4B, the second width W2 may be different from the first width W1, and the second distance I2 is substantially the same as the first distance I1. In other words, a sum of the first width W1 and the first distance I1 may be different from a sum of the second width W2 and the second distance I2.

Figure 5A:
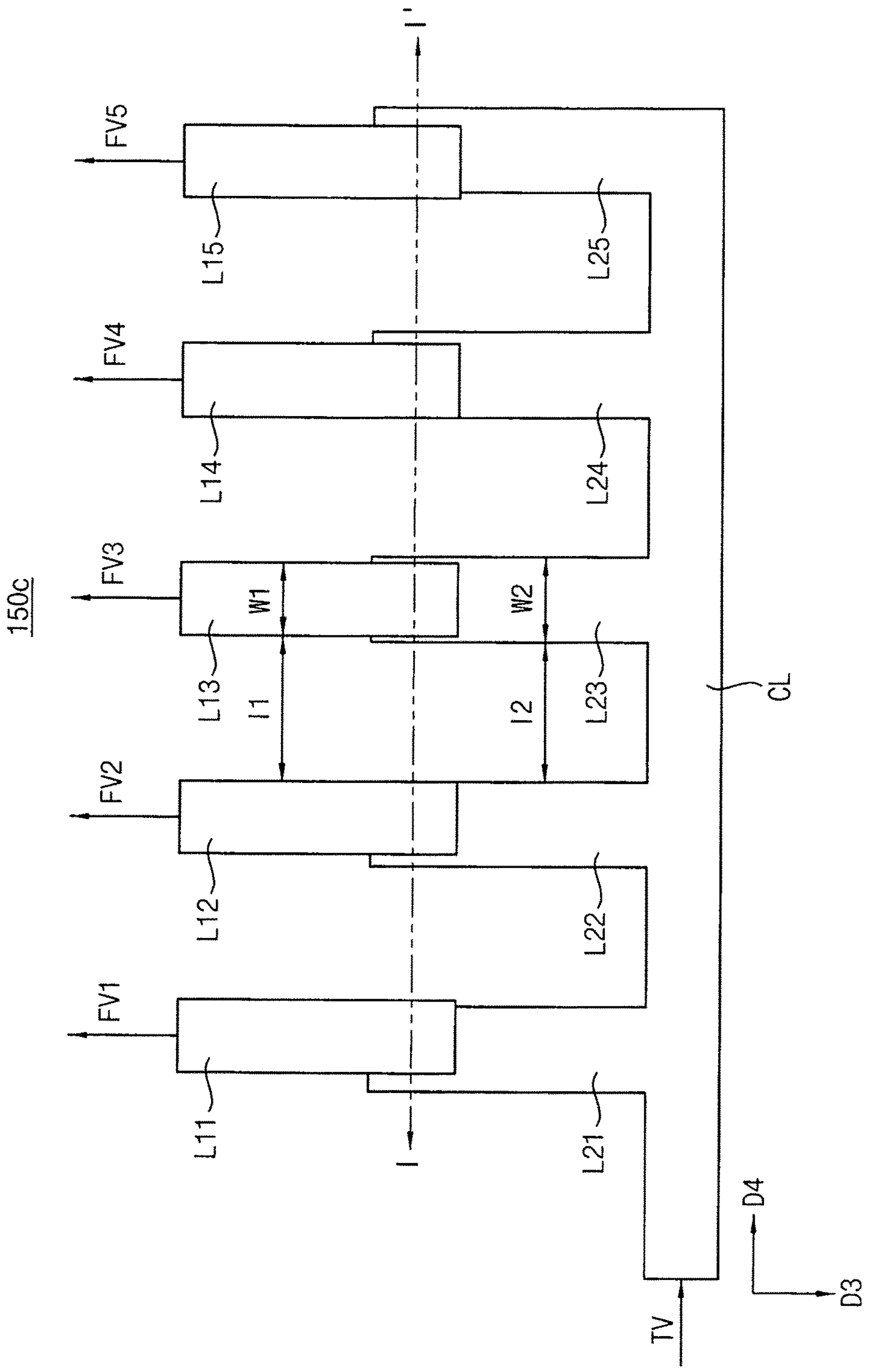
FIG. 5A is a diagram illustrating first and second test patterns included in a display apparatus according to an exemplary embodiment of the present inventive concept.
Figure 5B:
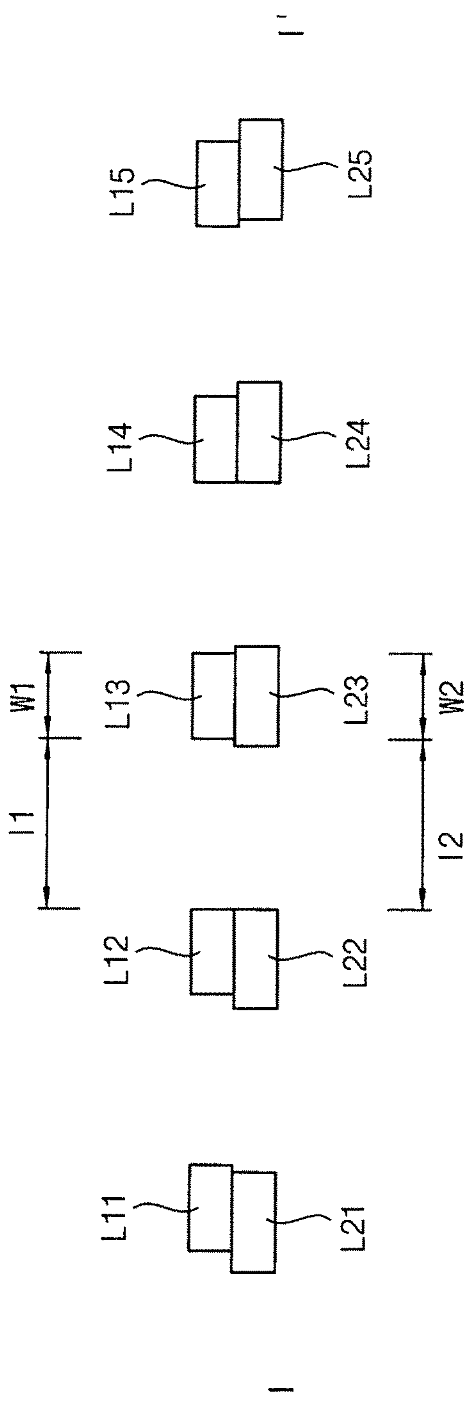
FIG. 5B is a cross-section taken along line I-I' of FIG. 5A.

FIG. 5A is a diagram illustrating first and second test patterns included in a display apparatus according to an exemplary embodiment of the present inventive concept. FIG. 5B is a cross-section taken along line I-I' of FIG. 5A.

Referring to FIGS. 1, 2, 5A and 5B, a test pattern part 150*c* includes first and second test patterns. The first test pattern includes a plurality of first lines L11, L12, L13, L14 and L15. The second test pattern includes a central line CL and a plurality of second lines L21, L22, L23, L24 and L25.

Each of the first lines L11-L15 has a first width W1. The first lines L11-L15 are spaced apart from each other by a first distance I1. Each of the second lines L21-L25 has a second width W2. The second width W2 may be different from the first width W1. The second lines L21-L25 are spaced apart from each other by a second distance I2. The second distance I2 may be different from the first distance I1.

As shown in FIGS. 5A and 5B, the second width W2 may be different from the first width W1, and the second distance I2 may be different from the first distance I1. In other words, a sum of the first width W1 and the first distance I1 may be different from a sum of the second width W2 and the second distance I2.

According to an exemplary embodiment of the present inventive concept, a sum of the first width W1 and the first distance I1 is different from a sum of the second width W2 and the second distance I2. Thus, if the second pattern is shifted with respect to the first pattern, the electrical connections between the second lines L21-L25 and the first lines L11-L15 may be disconnected.

Figure 6:
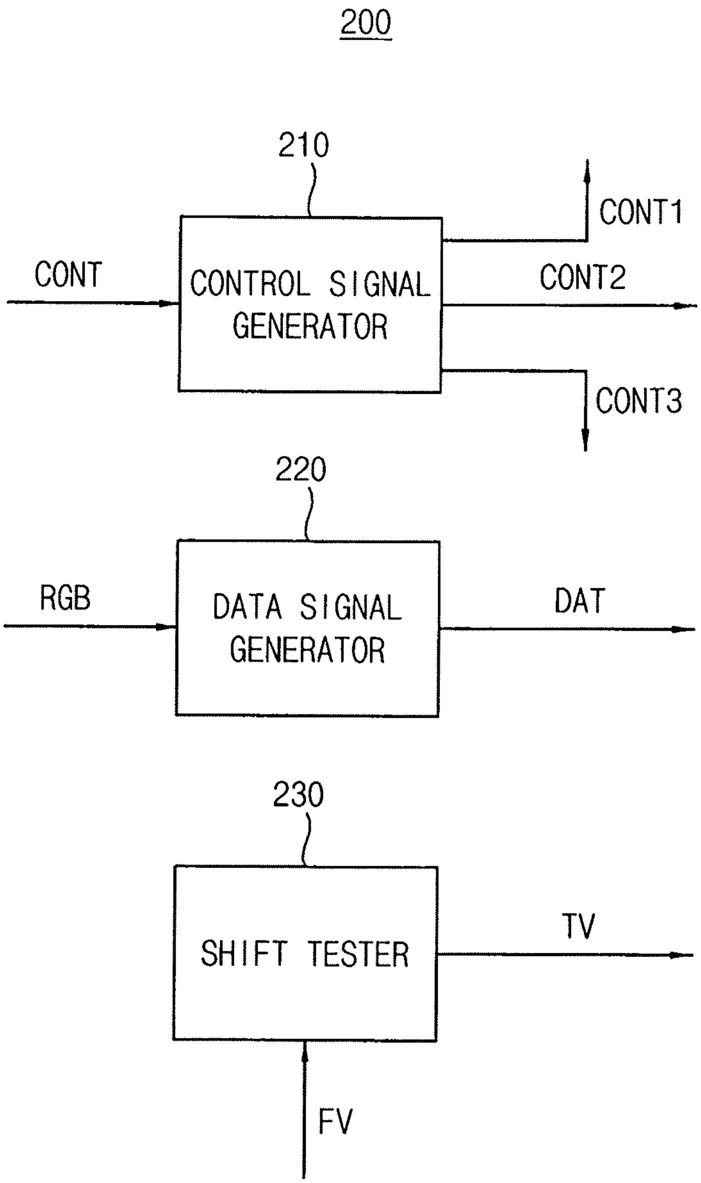
FIG. 6 is a block diagram illustrating a timing controller included in a display apparatus according to an exemplary embodiment of the present inventive concept.

FIG. 6 is a block diagram illustrating a timing controller included in a display apparatus according to an exemplary embodiment of the present inventive concept.

Referring to FIGS. 1 and 6, a timing controller 200 may include a control signal generator 210, a data signal generator 220 and a shift tester 230.

The control signal generator 210 may generate the first control signal CONT1, the second control signal CONT2 and the third control signal CONT3 based on the input control signal CONT.

The data signal generator 220 may generate the data signal DAT based on the input image data RGB.

The shift tester 230 may apply a test voltage TV to the test pattern part 150. The shift tester 230 may measure voltages FV from the test pattern part 150. The shift tester 230 may determine how much the second pattern is shifted with respect the first pattern based on the voltages FV. For example, the tester 230 may determine how many first lines of the first pattern are disconnected from the second lines of the second pattern.

Figure 7:
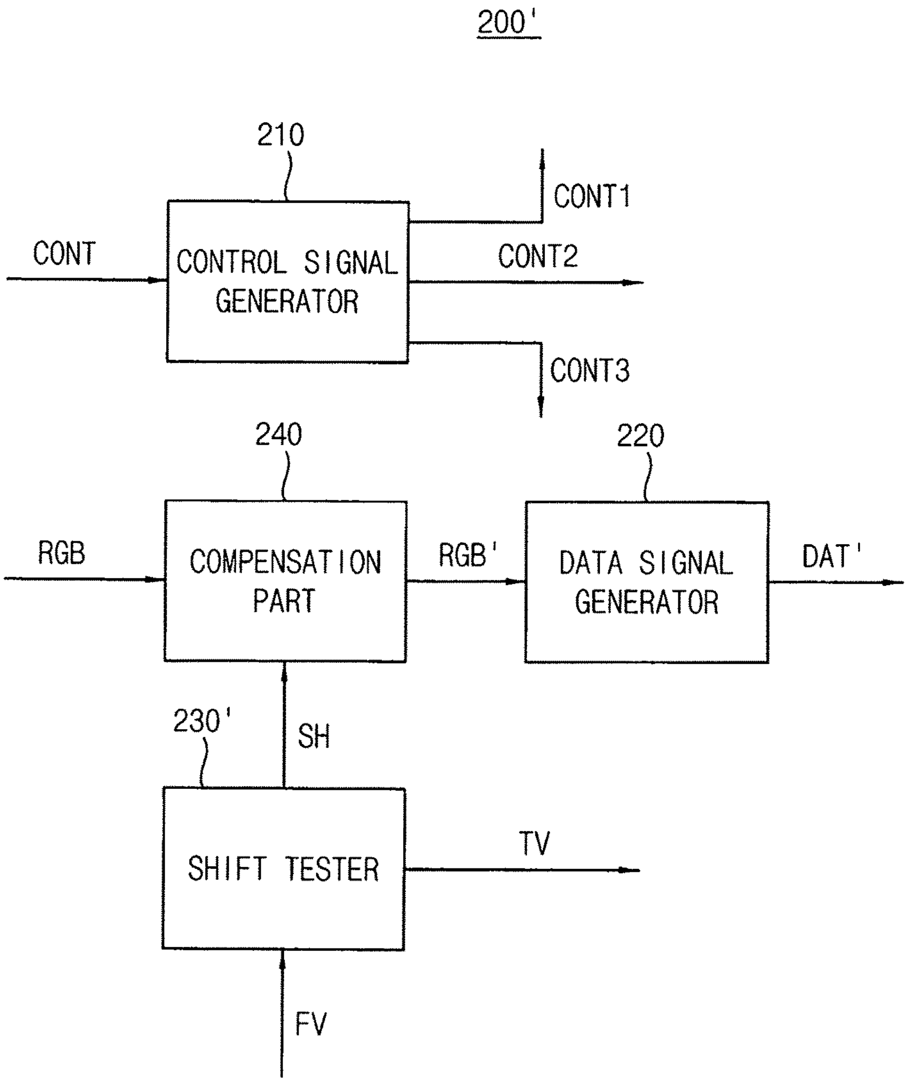
FIG. 7 is a block diagram illustrating a timing controller included in a display apparatus according to an exemplary embodiment of the present inventive concept.

FIG. 7 is a block diagram illustrating a timing controller included in a display apparatus according to an exemplary embodiment of the present inventive concept.

Referring to FIGS. 1, 6 and 7, a timing controller 200' may include a control signal generator 210, a data signal generator 220, a shift tester 230' and a compensation part 240.

The compensation part 240 may compensate the input image data RGB based on how much the second pattern is shifted with respect to the first pattern, based on an input signal SH received from the shift tester 230', and then generate compensated input image data RGB'.

The data signal generator 220 may generate a compensated data signal DAT' based on the compensated input image data RGB'.

Figure 8A:
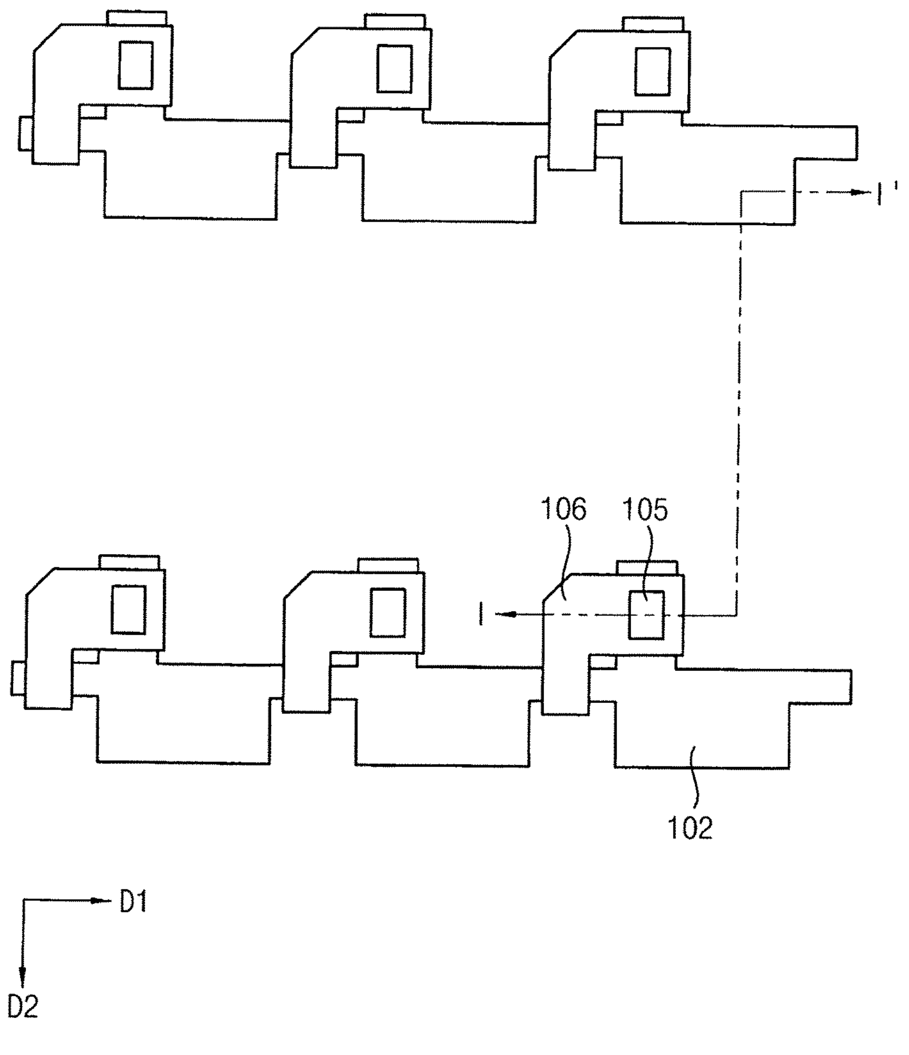
FIGS. 8A and 8B are diagrams illustrating a first process of a method of manufacturing a display apparatus according to an exemplary embodiment of the present inventive concept.
Figure 8B:
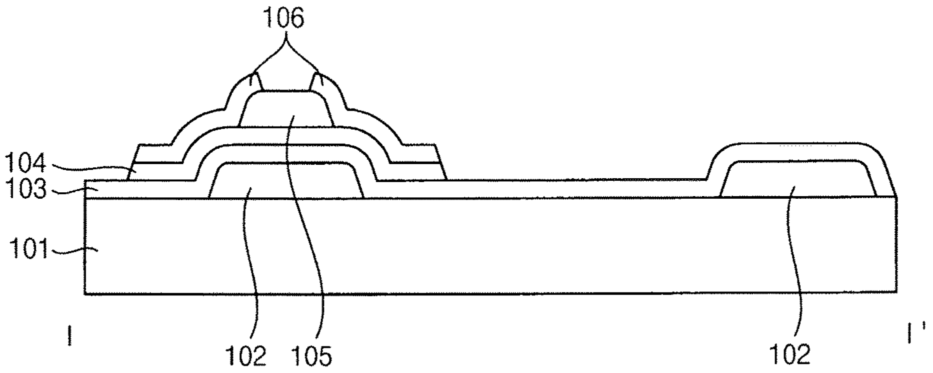

FIGS. 8A and 8B are diagrams illustrating a first process of a method of manufacturing a display apparatus according to an exemplary embodiment of the present inventive concept. FIG. 8B is a cross-section taken along a line I-I' of FIG. 8A.

Referring to FIGS. 8A and 8B, a gate electrode 102 may be formed on a base substrate 101. The gate electrode 102 may be electrically connected to a gate line GL. The gate electrode 102 may have a single layer structure including copper (Cu), silver (Ag), chrome (Cr), molybdenum (Mo), aluminum (Al), titanium (Ti), manganese (Mn) and/or a mixture thereof. In addition, the gate electrode 102 may have a multi layer structure having a plurality of layers including materials different each other. For example, the gate electrode 102 may include a lower layer including titanium (Ti) and an upper layer including copper (Cu) and formed above the lower layer.

A first insulation layer 103 may be formed on the gate electrode 102. The first insulation layer 103 covers a gate pattern, the gate electrode 102, and the base substrate 101. The gate pattern includes the gate electrode 102. The first insulation layer 103 may include, for example, an inorganic material such as silicon oxide (SiOx) and/or silicon nitride (SiNx). For example, the first insulation layer 103 may include silicon oxide (SiOx), and may have a thickness of about 500 Å. In addition, the first insulation layer 103 may include a plurality of layers including materials that may be different from each other.

A second insulation layer 104 may be formed on the first insulation layer 103. A third insulation layer 106 and an etch stopper 105 may be formed on the second insulation layer 104.

Figure 9A:
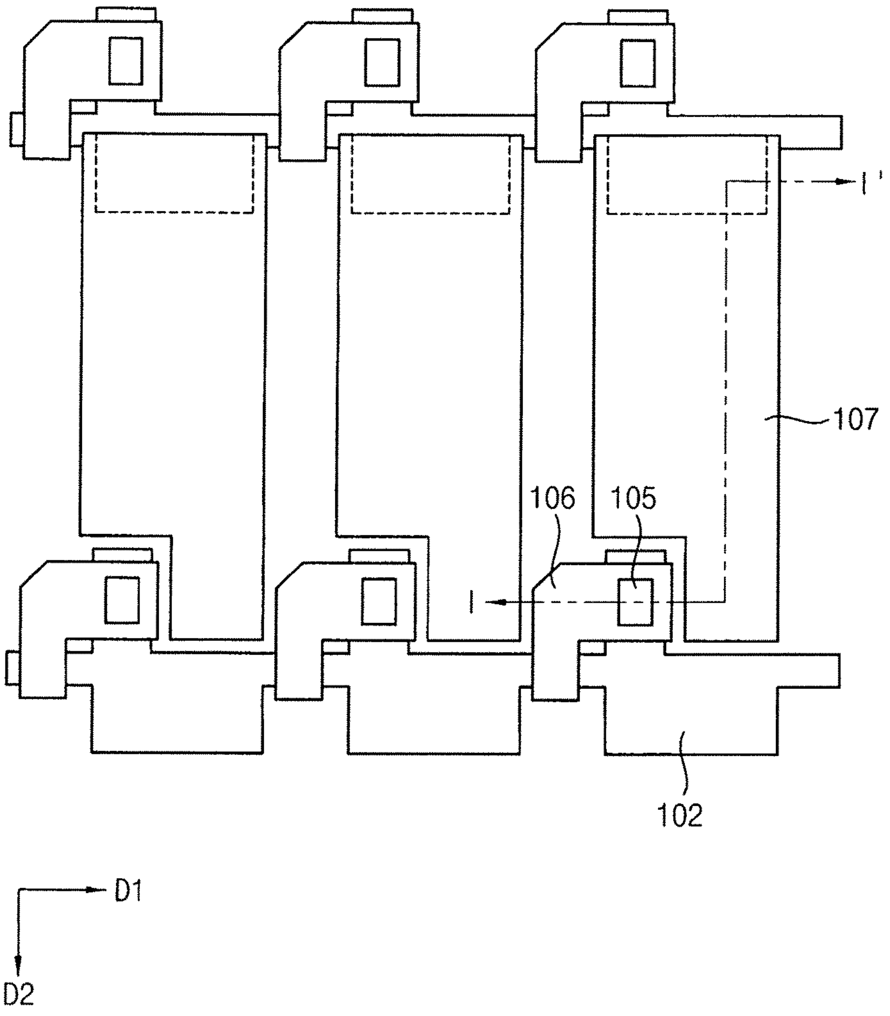
FIGS. 9A through 9C are diagrams illustrating a part of a second process of a method of manufacturing a display apparatus according to an exemplary embodiment of the present inventive concept.
Figure 9B:
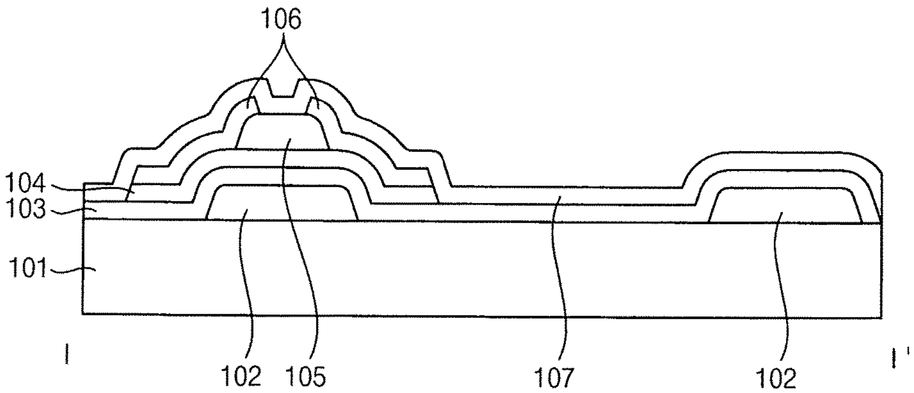
Figure 9C:
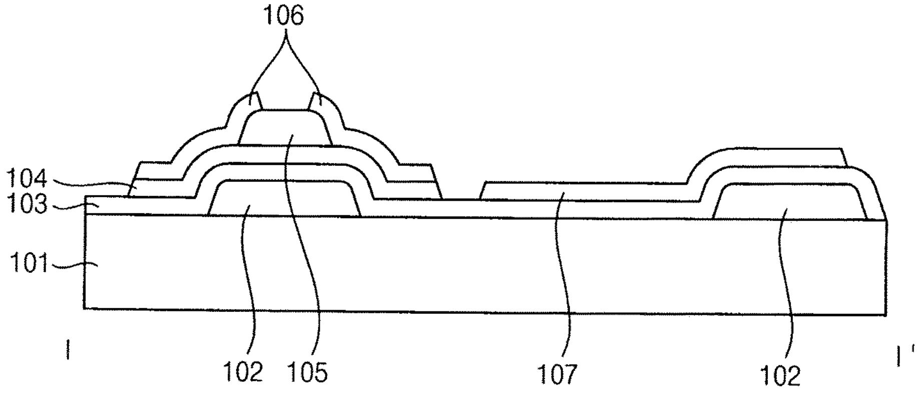

FIGS. 9A through 9C are diagrams illustrating a part of a second process of a method of manufacturing a display apparatus according to an exemplary embodiment of the present inventive concept. FIGS. 9B and 9C are cross-sectional diagrams taken along line I-I' of FIG. 9A.

Referring to FIGS. 8A, 8B and 9A through 9C, a pixel electrode 107 may be formed on the first insulation layer 103, the third insulation layer 106 and the etch stopper 105. The pixel electrode 107 may include a transparent conductive material, such as indium tin oxide (ITO) and/or indium zinc oxide (IZO). In addition, the pixel electrode 107 may include titanium (Ti) and/or molybdenum titanium (MoTi). The pixel electrode 107 may be patterned to have a shape as shown in FIGS. 9A and 9C.

Figure 10A:
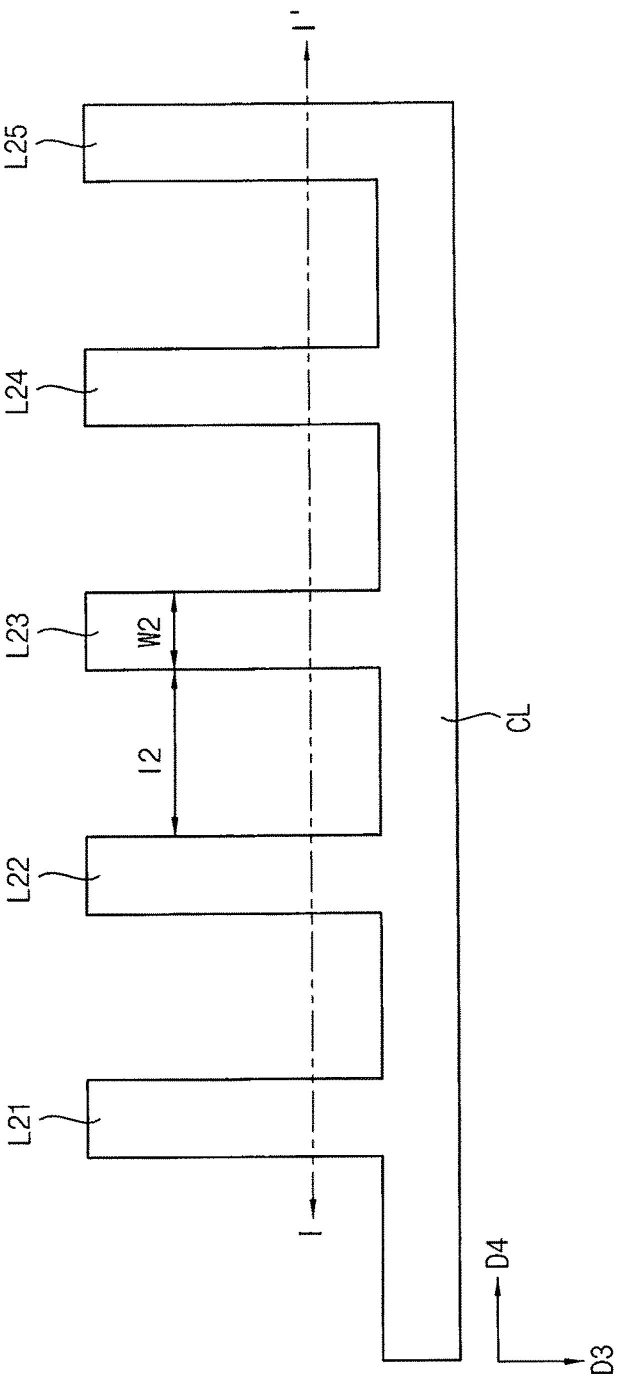
FIGS. 10A through 10C are diagrams illustrating a different part of the second process of a method of manufacturing a display apparatus according to an exemplary embodiment of the present inventive concept.
Figure 10B:
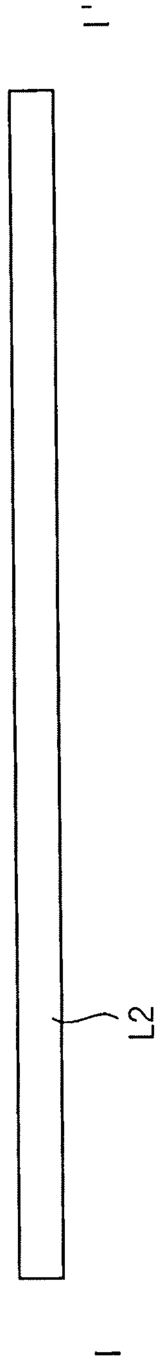
Figure 10C:
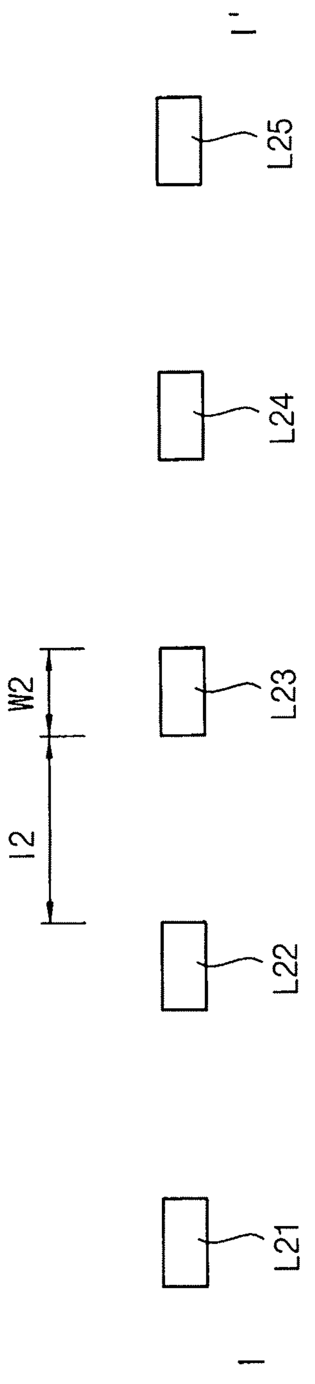

FIGS. 10A through 10C are diagrams illustrating a different part of the second process of a method of manufacturing a display apparatus according to an exemplary embodiment of the present inventive concept. FIGS. 10B and 10C are cross-sections taken along line I-I' of FIG. 10A.

Referring to FIGS. 9A through 9C and 10A through 10C, a second test pattern may be formed while the pixel electrode 107 is formed. For example, the second test pattern and the pixel electrode 107 may be formed in the same layer. In other words, the second test pattern and the pixel electrode 107 may be formed by patterning the same layer. The second test pattern may include a pattern L2, as shown in FIG. 10B. The second test pattern may include a central line CL and a plurality of second lines L21, L22, L23, L24 and L25, as shown in FIGS. 10A and 10C.

Figure 11A:
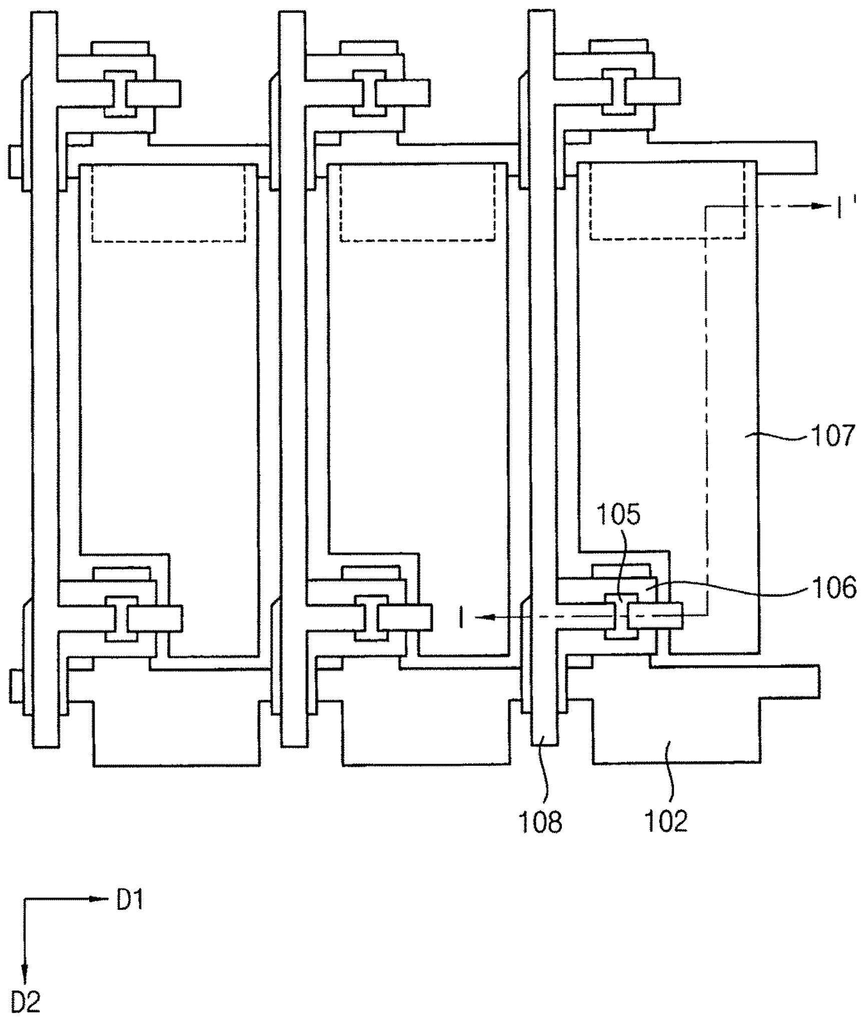
FIGS. 11A through 11C are diagrams illustrating a part of a third process of a method of manufacturing a display apparatus according to an exemplary embodiment of the present inventive concept.
Figure 11B:
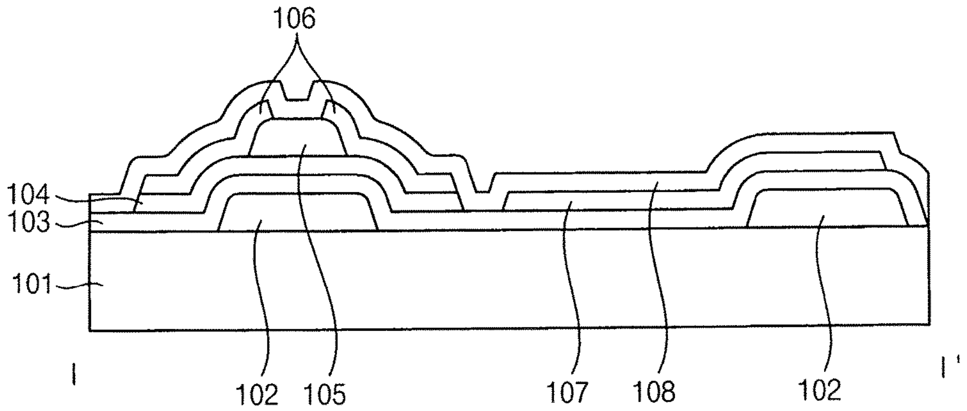
Figure 11C:
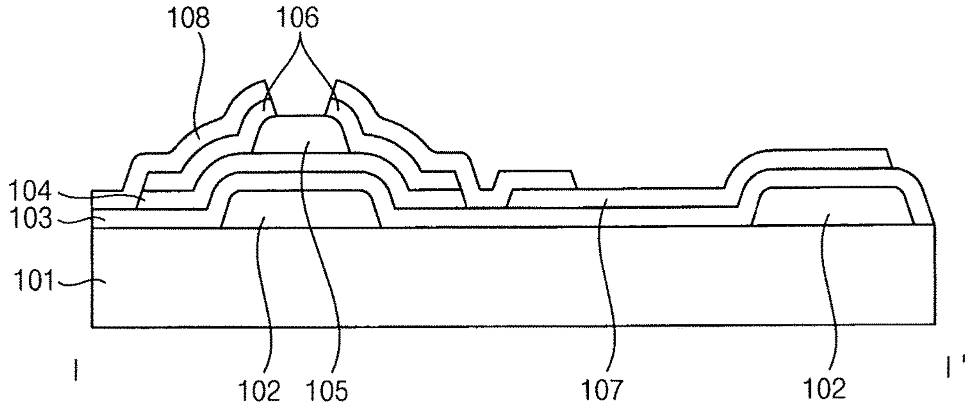

FIGS. 11A through 11C are diagrams illustrating a part of a third process of a method of manufacturing a display apparatus according to an exemplary embodiment of the present inventive concept. FIGS. 11B and 11C are cross-sections taken along a line I-I' of FIG. 11A.

Referring to FIGS. 8A, 8B, 9A through 9C and 11A through 11C, source and drain electrodes 108 may be formed on the first insulation layer 103, the third insulation layer 106, the etch stopper 105 and the pixel electrode 107. The source and drain electrodes 108 may be spaced apart from each other. The source and drain electrodes 108 may be formed in the same layer as the data lines DL.

The source and drain electrodes 108 may have a single layer structure including copper (Cu), silver (Ag), chrome (Cr), molybdenum (Mo), aluminum (Al), titanium (Ti), manganese (Mn) and/or a mixture thereof. In addition, the source and drain electrodes 108 may have a multi layer structure having a plurality of layers including materials different each other. For example, the source and drain electrodes 108 may include a copper layer and a titanium layer disposed on and/or under the copper layer. The source and drain electrodes 108 may be patterned to have a shape as shown in FIGS. 11A and 11C.

Figure 12A:
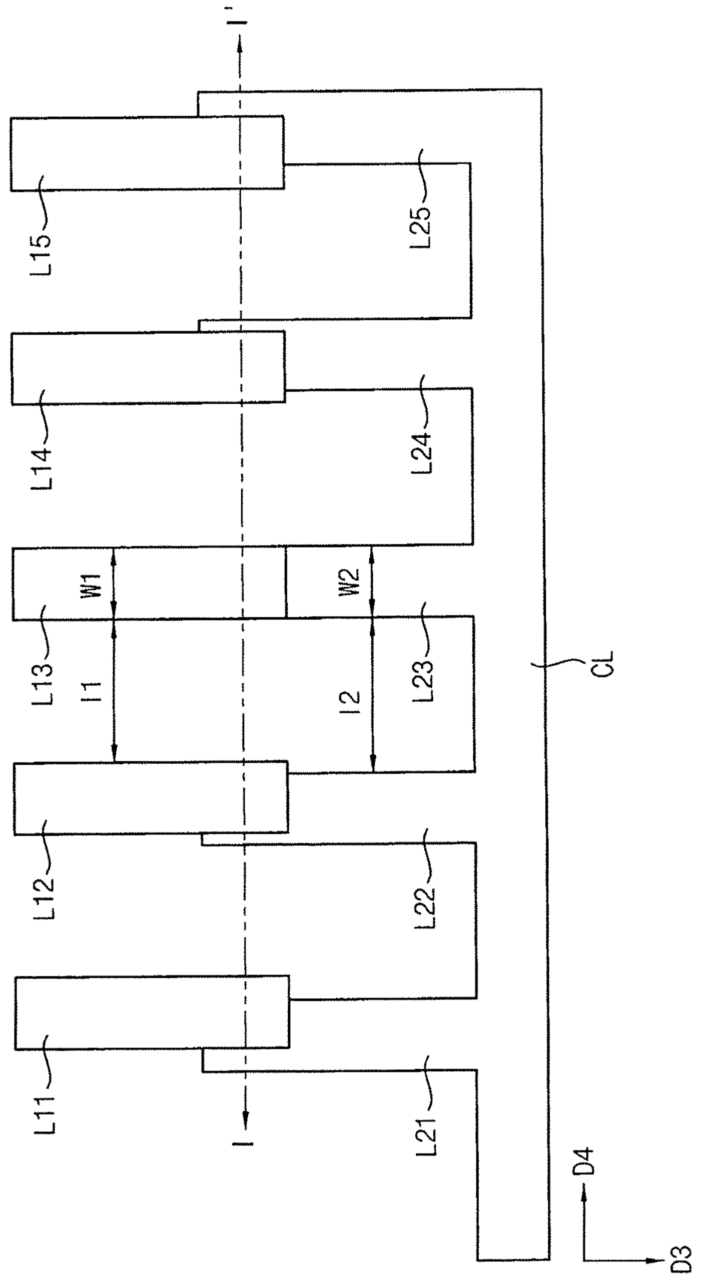
FIGS. 12A through 12C are diagrams illustrating a different part of the third process of a method of manufacturing a display apparatus according to an exemplary embodiment of the present inventive concept.
Figure 12B:
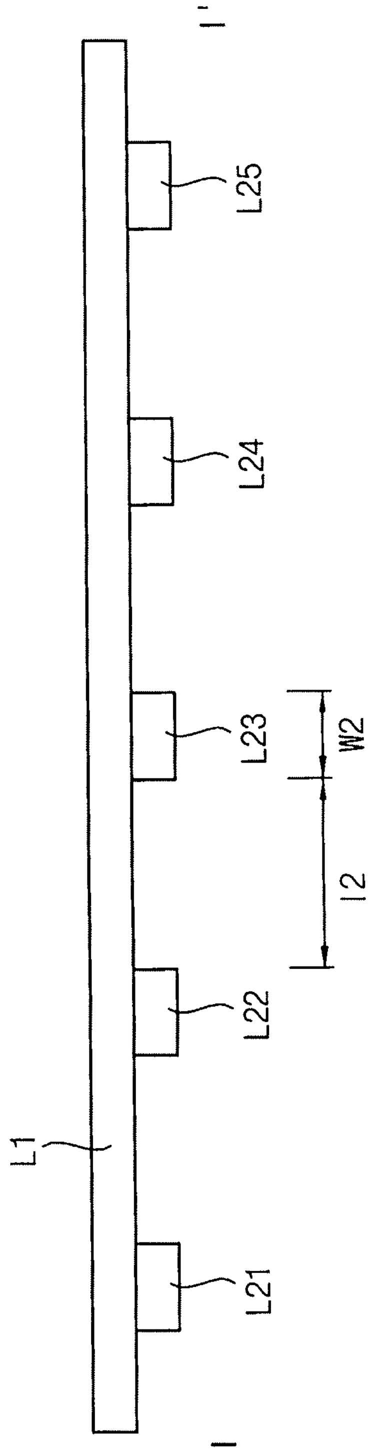
Figure 12C:
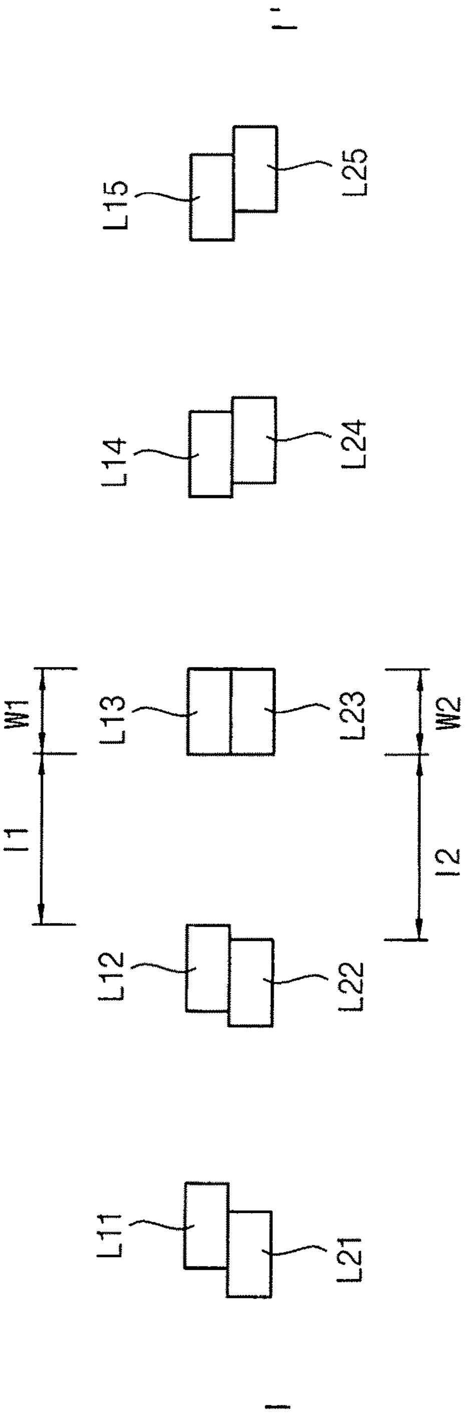

FIGS. 12A through 12C are diagrams illustrating a different part of the third process of a method of manufacturing a display apparatus according to an exemplary embodiment of the present inventive concept. FIGS. 12B and 12C are cross-sections taken along line I-I' of FIG. 12A.

Referring to FIGS. 11A through 11C and 12A through 12C, a first test pattern may be formed while the source and drain electrodes 108 or the data line DL are formed. For example, the first test pattern may be formed in the same layer as the source and drain electrodes 108 or the data line DL. In other words, the first test pattern and the source and drain electrodes 108 or the data line DL may be formed by patterning the same layer. The first test pattern may include a pattern L1, as shown in FIG. 12B. The pattern L1 may then be patterned to form the first test pattern having a shape as shown in FIGS. 12A and 12C. When patterned, the pattern L1 may include the first test pattern, the first test pattern including a plurality of first lines L11, L12, L13, L14 and L15, as shown in FIGS. 12A and 12C.

The above described exemplary embodiments of the present inventive concept may be used in a display apparatus and/or a system including the display apparatus, such as a mobile phone, a smart phone, a personal digital assistant (PDA), a portable media player (PMP), a digital camera, a digital television, a set-top box, a music player, a portable game console, a navigation device, a personal computer (PC), a server computer, a workstation, a tablet computer, a laptop computer, a smart card, a printer, etc.

While the present inventive concept has been particularly shown and described with reference to exemplary embodiments thereof, it will be apparent to those of ordinary skill in the art that various changes in form and detail may be made therein without departing from the spirit and scope of the present inventive concept as defined by the following claims.

What is claimed is:

1. A display apparatus, comprising:

a substrate;

a first pattern included in a first layer, wherein the first layer is disposed on the substrate;

a second pattern included in a second layer different from the first layer;

a first test pattern including a plurality of first lines, wherein each of the plurality of first lines extends in a first direction and has a first width, and wherein each of the plurality of first lines is spaced apart from a neighboring first line by a first distance in a second direction;

a second test pattern included in the second layer, wherein the second test pattern includes a central line and a plurality of second lines, wherein the central line extends in the second direction, wherein the plurality of second lines are connected to the central line, wherein each of the plurality of second lines extends in the first direction and has a second width, wherein each of the plurality of second lines is spaced apart from a neighboring second line by a second distance in the second direction, and wherein at least one of the second lines is electrically connected to the first lines; and a shift tester configured to apply a test voltage to the central line to determine a degree by which the second pattern is shifted with respect to the first pattern by measuring the voltages at the first lines.

2. The display apparatus of claim 1, wherein the shift tester is configured to determine a number first lines having a voltage substantially the same as the test voltage and a number of first lines having a voltage different from the test voltage to determine the degree by which the second pattern is shifted with respect to the first pattern.

3. The display apparatus of claim 2, wherein the degree by which the second pattern is shifted with respect to the first pattern corresponds to the number the first lines having a voltage different from the test voltage.

4. The display apparatus of claim 2, wherein the shift tester is configured to determine that the second pattern is not shifted with respect to the first pattern when the voltage measured from each of the first lines is substantially equal to the test voltage.

5. The display apparatus of claim 1, wherein the second distance is different from the first distance.

6. The display apparatus of claim 1, wherein the second width is different from the first width.

7. The display apparatus of claim 1, wherein the first layer is disposed on the second layer.

8. The display apparatus of claim 1, wherein a number of the first lines is equal to a number of the second lines.

9. The display apparatus of claim 1, wherein the first pattern includes a data line or a pixel electrode, and the second pattern includes a data line or a pixel electrode.

10. The display apparatus of claim 9, wherein the data line included in the first or second pattern extends in the first direction.

11. The display apparatus of claim 9, wherein the data line included in the first or second pattern extends in the second direction.

12. The display apparatus of claim 1, wherein the substrate includes a display region and a peripheral region disposed adjacent to the display region, wherein the first and second patterns are disposed in the display region, and the first and second test patterns are disposed in the peripheral region.

13. The display apparatus of claim 1, wherein input image data is compensated based on the degree by which the second pattern is shifted with respect to the first pattern.

14. A method of driving a display apparatus, comprising:

applying a test voltage to a first test pattern which is electrically connected to a first pattern, wherein the first test pattern is included in a first layer, wherein the first layer is disposed on a substrate, wherein the first test pattern includes a central line and a plurality of first lines connected to the central line, wherein the central line extends in a first direction and each of the first lines extend in a second direction crossing the first direction, wherein each of the first lines has a first width and each of the first lines is spaced part from a neighboring first line by a first distance in the first direction;

measuring a voltage from each of a plurality of second lines, each of which is electrically connected to a second pattern, wherein the second lines are included in a second layer different from the first layer, wherein the second lines extend in the second direction, and wherein each of the second lines has a second width and each of the second lines is spaced part from a neighboring second line by a second distance in the first direction; and determining how much the first pattern is shifted with respect to the second pattern based on the measured voltage.

15. The method of claim 14, wherein determining how much the first pattern is shifted with respect to the second pattern comprises:

determining a number of the second lines in which the measured voltage is substantially the same as the test voltage and a number of second lines in which the measured voltage is different from the test voltage.

16. The method of claim 15, wherein a degree of how much the first pattern is shifted compared to the second pattern comprises corresponds to the number of second lines in which the measured voltage is different from the test voltage.

17. The method of claim 15, wherein determining how much the first pattern is shifted with respect to the second pattern includes determining that the first pattern is not shifted with respect to the second pattern when the voltage measured from each of the second lines is substantially equal to the test voltage.

18. The method of claim 14, further comprising:

compensating input image data based on how much the first pattern is shifted with respect to the second pattern.

19. A method of manufacturing a display apparatus, comprising:

forming a first test pattern including a plurality of first lines and forming a first pattern on a substrate, wherein each of the first lines extends in a first direction and has a first width, and wherein each of the first lines is spaced apart from a neighboring first line by a first distance in a second direction crossing the first direction; and forming a second test pattern including a central line and a plurality of second lines and forming a second pattern on the substrate, wherein the central line extends in the second direction, wherein the second lines are connected to the central line, wherein each of the second lines extends in the first direction and has a second width, and wherein each of the second lines is spaced apart from a neighboring second line by a second distance in the second direction.

20. The method of claim 19, wherein each of the first and second patterns includes a data line or a pixel electrode.

21. A display apparatus, comprising:

a substrate;

a first pattern included in a first layer, wherein the first layer is disposed over the substrate;

a second pattern included in a second layer disposed over the substrate;

a first plurality of test patterns including a plurality of first lines included in the first pattern;

a second plurality of test patterns included in the second pattern, wherein the second plurality of test patterns includes a central line connected to a plurality of second lines, wherein at least one of the first plurality of test patterns overlap and electrically connected to at least one of the second plurality of test patterns; and a shift tester configured to apply a test voltage to the central line to determine which of the first plurality of the first patterns and the second plurality of test patterns are overlapped and electrically connected by measuring the voltages at the first lines.

* * * * *